United States Patent
Ochi et al.

(10) Patent No.: US 7,606,174 B2
(45) Date of Patent: Oct. 20, 2009

(54) SIGNAL TRANSMISSION APPARATUS

(75) Inventors: Mitsunori Ochi, Hamamatsu (JP); Taku Nishikori, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1134 days.

(21) Appl. No.: 10/850,613

(22) Filed: May 19, 2004

(65) Prior Publication Data

US 2004/0233852 A1 Nov. 25, 2004

(30) Foreign Application Priority Data

| May 20, 2003 | (JP) | ............................. | 2003-141480 |
| May 20, 2003 | (JP) | ............................. | 2003-141486 |
| May 20, 2003 | (JP) | ............................. | 2003-141493 |
| May 20, 2003 | (JP) | ............................. | 2003-141498 |
| May 20, 2003 | (JP) | ............................. | 2003-141507 |

(51) Int. Cl.
- H04L 12/28 (2006.01)
- H04J 3/24 (2006.01)
- H04J 3/12 (2006.01)
- G06F 11/00 (2006.01)
- G06F 7/02 (2006.01)

(52) U.S. Cl. ........................ 370/255; 370/389; 370/474; 370/522; 714/52; 714/821

(58) Field of Classification Search .................... 714/4, 714/50, 52, 55, 819, 820, 821; 370/255, 370/528

See application file for complete search history.

(56) References Cited

U.S. PATENT DOCUMENTS 6,804,710 B1 * 10/2004 Kawada et al. .............. 709/221

7,218,648 B1 * 5/2007 Jackson ....................... 370/528
2003/0058790 A1 3/2003 Nagamine (Continued)

FOREIGN PATENT DOCUMENTS

JP 63-155835 6/1988

(Continued)

OTHER PUBLICATIONS

Automatic Configuration of Audio Amplifiers in HI-FI Audio/Video Systems, IBM, Technical Disclosure Bulletin, vol. 39, No. 10, Oct. 1996, pp. 203-205.

(Continued)

Primary Examiner—Seema S Rao
Assistant Examiner—Christine Duong
(74) Attorney, Agent, or Firm—Morrison & Foerster LLP

(57) ABSTRACT

A signal transmission apparatus is connected to a network as one node among a plurality of nodes involved in the network which is provided with an audio signal transmission period for transmitting a plurality of channels of audio signals each transmission cycle and a control data transmission period for transmitting control data of the plurality of the nodes each control cycle by using an idle time period other than the audio signal transmission period. In the signal transmission apparatus, a storage section stores configuration information of the one node. A transmitting section transmits the control data including an error checking code of the configuration information. A receiving section receives request data from another node, the request data requesting the one node for transmission of an information block of the configuration information. A control section controls the transmitting section to transmit the information block in response to the request data.

5 Claims, 10 Drawing Sheets

U.S. PATENT DOCUMENTS

2003/0143989 A1 * 7/2003 Ho et al. .................... 455/418

FOREIGN PATENT DOCUMENTS

| | | |
|---|---|---|
| JP | 01-208044 | 8/1989 |
| JP | 09-190388 | 1/1996 |
| JP | 08-191318 | 7/1996 |
| JP | 9219714 | 8/1997 |
| JP | 10-313337 | 11/1998 |
| JP | 2003-101559 | 4/2003 |
| JP | 2003-110588 | 4/2003 |
| WO | WO 02/096139 A1 | 11/2002 |

OTHER PUBLICATIONS

"Audio Networks An Overview", Cirrus Logic, Inc., 2001, pp. 1-18 and 2001 Peak Audio, Inc. (a division of Cirrus Logic, Inc.), pp. 60-66.

* cited by examiner

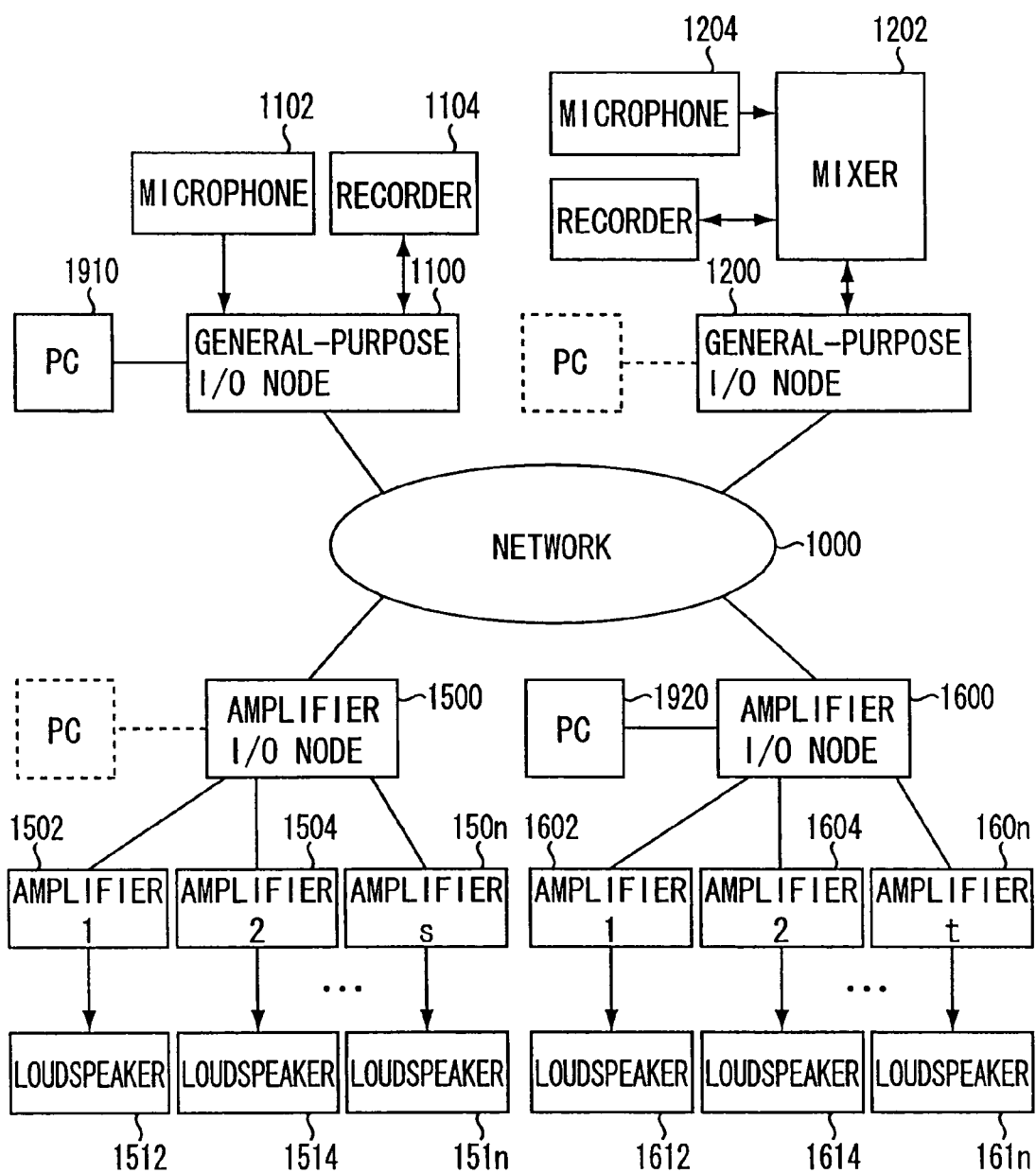

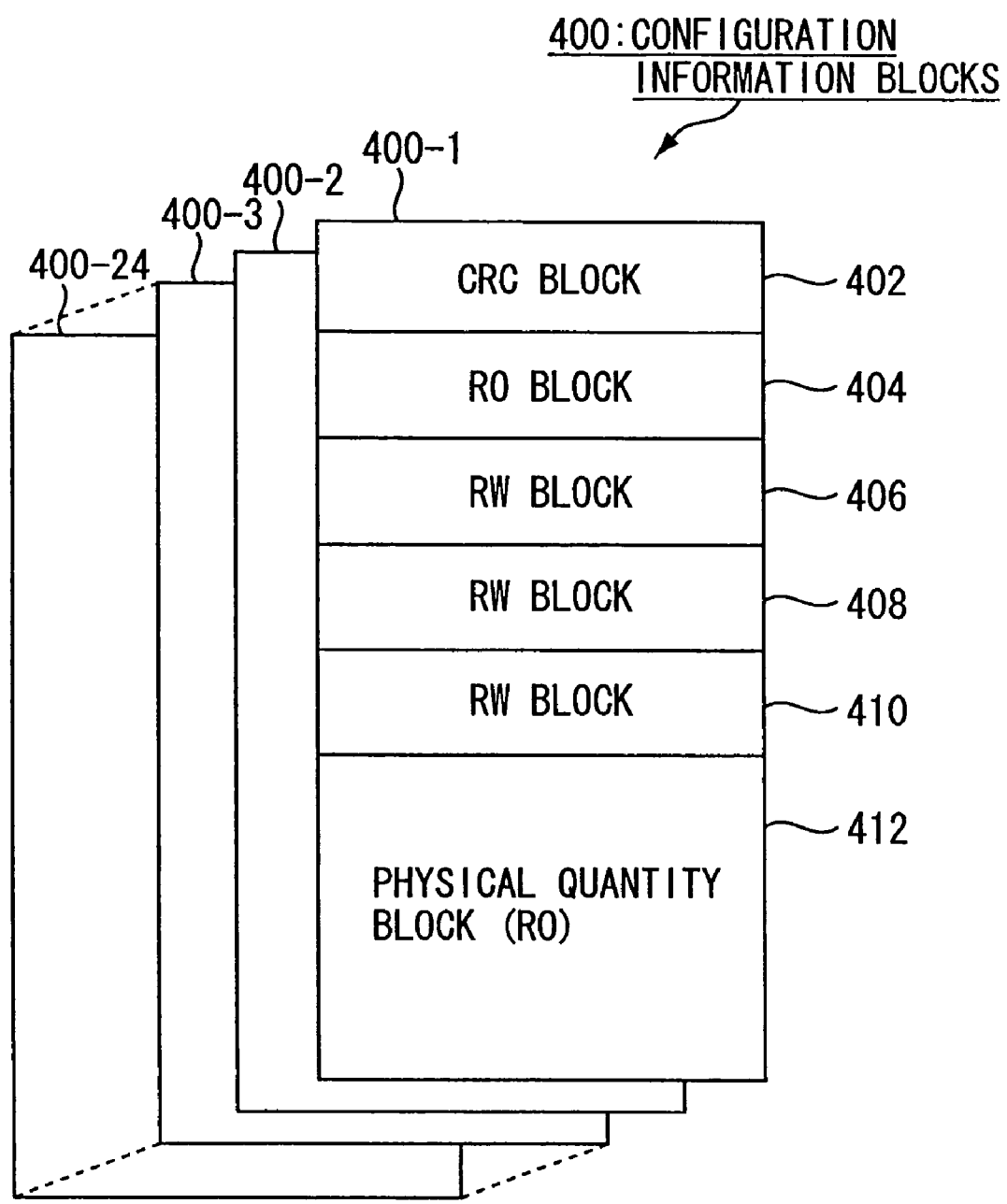

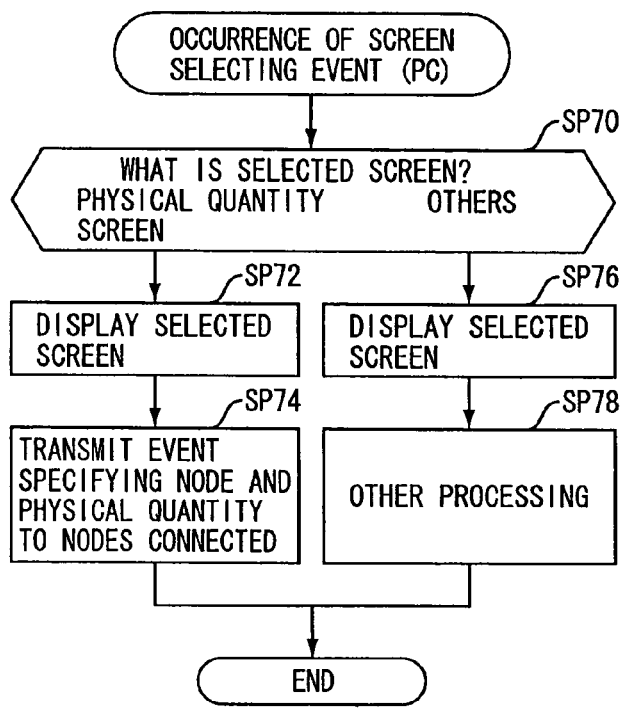
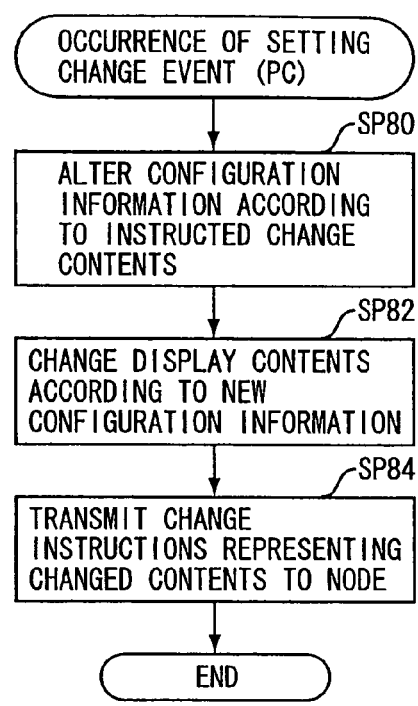
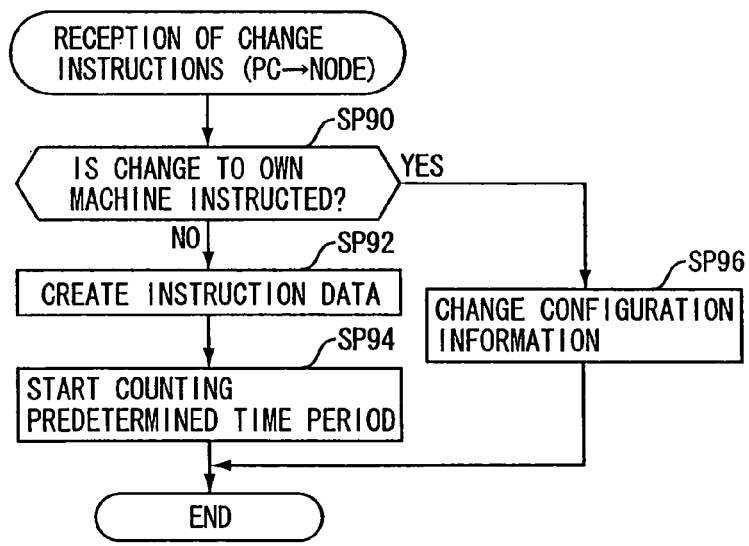

SIGNAL TRANSMISSION APPARATUS

BACKGROUND OF THE INVENTION

1. Technical Field of the Invention

The present invention relates to a signal transmission apparatus adapted for use in a system for transmitting an audio signal through a network while controlling audio amplifiers, mixers and other audio equipment connected to the network.

2. Prior Art

In a sound system used at a big concert hall and the like, multiple channels of audio signals generated by a mixing system and the like are sounded from many loudspeakers through many amplifiers. Since the number of cables will become enormous if a cable for audio signal transmission is installed for each individual channel, it is desirable to convert multiple channels of audio signals into audio data packets and to transmit them through a digital network.

The technology of CobraNet™ is known as a protocol method of transmitting multiple channels of audio data in real time through a network of a CSMA/CD (Carrier Sense Multiple Access with Collision Detection) system such as the Ethernet (registered trademark). CobraNet technology is disclosed in Non-patent literature, *Audio Networks An Overview*, Cirrus Logic, Inc., 2001.1. In the CSMA/CD system, an arbitration is used when a collision occurs, that is, when two or more nodes start transmission simultaneously. However, the occurrence of a collision actually causes band losses due to arbitration. In view of this, CobraNet assigns a transmission period of audio data to each node involved in the network within one transmission cycle to avoid a collision, thus enabling efficient transmission of up to 128 channels of audio data.

Referring now to FIG. 3(*a*), a general outline of the protocol of CobraNet will be described. First, in the protocol of CobraNet, audio data is outputted from each node on the network within one transmission cycle (denoted 200 in the figure) set at an interval of 1.33 msec. Then, one of nodes is set as a special node (called the "conductor") for managing the transmission cycle 200. At the beginning of each transmission cycle 200, the conductor outputs a beat packet (startup packet) 201 on a network 1000.

The output of this beat packet 201 stimulates all nodes including the conductor node to output audio data packets 211, 212, . . . , 21*n*, respectively, in predetermined order. These packets are called "bundles" and "one" bundle contains audio data of several channels, for example, a maximum of "8" channels. Each bundle is given a bundle number that does not overlap with other bundles. A node seeking to receive outputted audio data determines a target bundle from the bundle number and captures the bundle that contains audio data to be received, and retrieves audio data of a desired channel from the received bundle. Each of the packets 211, 212, . . . , 21*n* transmitted from each node may occasionally carry two or more bundles. Then, CobraNet provides a serial communication period in which a serial communication packet 220 can be transmitted, in an idle time interval within the transmission cycle 200, the idle time interval being provided after completion of output of all the packets within one transmission cycle 200.

Thus, CobraNet enables serial communication using the idle time interval provided within the transmission cycle 200. However, since the band for serial communication is narrow by definition, the transmission of control data causes a problem of increasing delay time. In addition, since the delay time depends on the number of bundles of audio data, it is difficult to stably control many audio amplifiers and other audio equipment involved in the network, and to stably collect status data of the amplifiers and other audio equipment from the network.

For such reasons, the serial communication packet 220 defined in the CobraNet protocol is not so often used in practice. Instead, QSControl (trademark) and Audia (trademark) are known for example as technology of transmitting control data to a system to which CobraNet is applied. In these technology, the control of each node, for example, the collection and control of the states of the amplifiers, is performed through a dedicated network for control data independent of the CobraNet network.

However, the use of the separate network independent of the CobraNet network to control the amplifiers and the like requires physical connection for both CobraNet network and the separate network. Stated otherwise, an audio data network cable and a control data network cable are separately required to connect each node. This increases the number of cables used and hence causes a problem of increasing the trouble in building up the sound system.

SUMMARY OF THE INVENTION

The present invention has been made in view of the foregoing circumstances, and it is an object of the invention to provide a signal transmission apparatus capable of stably monitoring and controlling audio amplifiers and other audio equipment through a narrow-band transmission line of control data.

In solving the above-mentioned problems, the present invention comprises the following structures. Namely, in a first aspect of the invention, a signal transmission apparatus is connected to a network as one node among a plurality of nodes involved in the network which is provided with an audio signal transmission period for transmitting a plurality of channels of audio signals each transmission cycle and a control data transmission period for transmitting control data of the plurality of the nodes each control cycle by using an idle time period other than the audio signal transmission period. The signal transmission apparatus comprises a storage section that stores configuration information of said one node, the configuration information representing a setting state of said one node, a transmitting section that transmits the control data including an error checking code of the configuration information, the error checking code being a code data for checking an error of the configuration information, and a control section that determines whether the configuration information contains an information block to be transmitted, and operates in case that the configuration information is determined to contain the information block to be transmitted for controlling the transmitting section to transmit the information block together with the error checking code.

Preferably, the signal transmission apparatus further comprises a receiving section that receives an error checking code from another node through the network, the error checking code being a code data for checking an error of configuration information representing a setting state of said another node, wherein the storage section further stores configuration information of all the nodes including said another node together with error checking codes corresponding to the respective configuration information, and wherein the control section includes a comparison subsection that compares the received error checking code of said another node with the stored error checking code corresponding to said another node so as to detect an inconsistency between the received error checking code and the stored error checking code, such that the control section operates when the inconsistency is detected for controlling the transmitting section to transmit the control data containing request data to said another node, the request data requesting said another node for transmission of an information block of the configuration information associated to the received error checking code.

Preferably, in the signal transmission apparatus, the receiving section can receive request data from another node, the request data requesting said one node for transmission of an information block of the configuration information of said one node, such that the control section operates upon the receiving of the request data for controlling the transmitting section to transmit the information block to said another node.

Preferably, in the signal transmission apparatus, the plurality of the nodes involved in the network sequentially transmit the control data according to a predetermined transmission order within the control data transmission period, such that the control section controls the transmitting section to transmit the control data at a timing when said one node comes in turn of the predetermined transmission order.

In a second aspect of the invention, a signal transmission apparatus is connected to a network as one node among a plurality of nodes involved in the network which is provided with an audio signal transmission period for transmitting a plurality of channels of audio signals each transmission cycle and a control data transmission period for transmitting control data of the plurality of the nodes each control cycle by using an idle time period other than the audio signal transmission period. The signal transmission apparatus comprises a transmitting section that transmits the control data in the control data transmission period, and a control section including a list creation subsection that creates a transmission order list determining a transmission order of the plurality of the nodes within one control cycle for sequentially transmitting the control data, the control section controlling the transmitting section to transmit the control data including the created transmission order list for distributing the transmission order list to all of the nodes involved in the network.

Preferably, the control section includes a monitoring subsection that monitors whether all the nodes sequentially transmit the control data according to the determined transmission order, and an instruction subsection that detects a failed node which does not transmit the control data despite reaching a turn of the determined transmission order and instructs a node immediately subsequent to the failed node in the determined transmission order to transmit the control data, and the list creation subsection operates when the failed node is detected for creating a new transmission order list from which the failed node is eliminated.

Preferably, the control section includes a new node detection subsection that detects whether a new node is added to the network, such that the list creation subsection operates when the new node is detected for creating a new transmission order list to which the new node is added.

Preferably, said one node is selected as a sole commander node among the plurality of the nodes connected to the network for commanding all the nodes.

Preferably, each of the nodes involved in the network sequentially transmits the control data at each timing when each node comes in turn of the transmission order determined by the distributed transmission order list.

In a third aspect of the invention, a signal transmission apparatus is connected to a network as one node among a plurality of nodes involved in the network which is provided with an audio signal transmission period for transmitting a plurality of channels of audio signals each transmission cycle and a control data transmission period for transmitting control data of the plurality of the nodes each control cycle by using an idle time period other than the audio signal transmission period, said one node being connected to a control device separately from the network. The signal transmission apparatus comprises a storage section that stores configuration information of all the nodes involved in the network including said one node and other nodes, the configuration information representing a setting state of each node, an input section that receives a change instruction from the control device for instructing a change of the stored configuration information, a determination section that determines whether the change instruction is to instruct a change of the configuration information associated to said one node, and a transmitting section operative in case that the change instruction is determined to instruct the change of the configuration information associated to other node than said one node, for transmitting the control data containing instruction data to said other node without changing the configuration information of said one node, the instruction data enabling said other node to execute the change of the configuration information associated to said other node according to the change instruction.

Preferably, the signal transmission apparatus further comprises an update section operative in case that the change instruction is determined to instruct the change of the configuration information associated to said one node, for updating the configuration information of said one node stored in the storage section, and wherein the transmitting section transmits the control data containing change data representing a content of the updated configuration information to other nodes. For example, said one node is connected to an audio processing device for processing the audio signals according to a part of the stored configuration information, and the update section operates in case that the change instruction instructs the change of the part of the configuration information associated to the audio processing device, for changing the setting state of the audio processing device according to the change instruction.

Preferably, the signal transmission apparatus further comprises a receiving section that receives from other node change data indicating a content of the configuration information changed at said other node, and an update section that changes a content of the configuration information of said other node stored in the storage section according to the received change data.

Preferably, the plurality of the nodes involved in the network sequentially transmit control data according to a predetermined transmission order within the control data transmission period, such that the transmitting section transmits the control data at a timing when said one node comes in turn of the predetermined transmission order.

In a fourth aspect of the invention, a control apparatus is connected to one node among a plurality of nodes involved in a network which is provided with an audio signal transmission period for transmitting a plurality of channels of audio signals each transmission cycle and a control data transmission period for transmitting control data of the plurality of the nodes each control cycle by using an idle time period other than the audio signal transmission period. The control apparatus comprises a storage section that stores configuration information of all the nodes involved in the network, the configuration information representing a setting state of each node, a display section that displays a content of the configuration information stored in the storage section, a changing section operative when a change operation is performed for rewriting a content of the stored configuration information as instructed by the change operation, an output section that feeds a change instruction to said one node in response to the change operation for effectuating a change of the configuration information in one or more node of the network, an input section that receives change data fed back from said one node, the change data representing a changed result of the configuration information effectuated in one or more node of the network, and a determination section that determines whether the changed result represented by the received change data matches or mismatches the rewritten content of the stored configuration information, and that issues a warning in case that the changed result of the configuration information mismatches the rewritten content of the stored configuration information.

Preferably, the display section updates the displaying of the stored configuration information based on the change operation such that the rewritten content of the configuration information is displayed in a visually different mode than a visually normal mode by which other contents than the rewritten content are displayed. Further, the display section returns the rewritten content of the configuration information from the visually different mode to the visually normal mode when the input section receives the change data fed back from said one node. Moreover, the changing section overwrites the rewritten content of the stored configuration information according to the change data fed back from said one node.

Preferably, the control apparatus further comprises a setting section that sets an operation mode for determining whether to issue the warning or not, such that the warning is issued on the condition that the operation mode is set to issue the warning and the mismatch is determined by the determination section.

In a fifth aspect of the invention, a signal transmission apparatus is connected to a network as one node among a plurality of nodes involved in the network which is provided with an audio signal transmission period for transmitting a plurality of channels of audio signals each transmission cycle and a control data transmission period for transmitting control data of the plurality of the nodes each control cycle by using an idle time period other than the audio signal transmission period. The signal transmission apparatus comprises a first determination section that determines whether a predetermined time period has elapsed since the start of a current control cycle, a second determination section that determines whether the transmission of the control data from all the nodes is completed in the current control cycle, and a cycle starting section that transmits a start signal to all of the nodes for starting a new control cycle when results of determination by the first and second determination sections are both affirmative. Preferably, said one node is selected as a sole commander node among the plurality of the nodes connected to the network for commanding all the nodes. Preferably, the plurality of the nodes involved in the network sequentially transmit control data according to a predetermined transmission order within the control data transmission period, such that said one node transmits the control data at a timing when said one node comes in turn of the predetermined transmission order.

Another signal transmission apparatus is connected to a network as one node among a plurality of nodes which treat various physical quantities in processing of audio signals, the network being provided with an audio signal transmission period for transmitting a plurality of channels of audio signals each transmission cycle and a control data transmission period for transmitting control data of the plurality of the nodes each control cycle by using an idle time period other than the audio signal transmission period. The signal transmission apparatus comprises a creating section that creates instruction data which instructs another node to transmit a particular one of the physical quantities treated by said another node, a transmitting section that transmits the control data including the created instruction data to said another node through the network, and a receiving section that receives the control data containing a value of the particular physical quantity from said another node. Preferably, said one node is selected as a sole commander node among the plurality of the nodes connected to the network for collecting the values of the various physical quantities treated in the plurality of the nodes.

A further signal transmission apparatus is connected to a network as one node among a plurality of nodes which treat various physical quantities in processing of audio signals, the network being provided with an audio signal transmission period for transmitting a plurality of channels of audio signals each transmission cycle and a control data transmission period for transmitting control data of the plurality of the nodes each control cycle by using an idle time period other than the audio signal transmission period. The signal transmission apparatus comprises a receiving section that receives the control data containing instruction data form another node, the instruction data instructing said one node to transmit a first physical quantity and a second physical quantity treated by said one node, and a transmitting section that transmits the control data containing values of the first physical quantity and second physical quantity, such that the value of the first physical quantity is transmitted every control cycle, while the value of the second physical quantity is transmitted at a control cycle immediately after a variation in the value of the second physical quantity is detected in said one node. Preferably, the first physical quantity is variable at a high frequency as compared to the second physical quantity, and the second physical quantity is variable at a low frequency as compared to the first physical quantity. Preferably, the plurality of the nodes involved in the network sequentially transmit control data according to a predetermined transmission order within the control data transmission period, such that said one node transmits the control data at a timing when said one node comes in turn of the predetermined transmission order.

BRIEF DESCRIPTION OF THE DRAWINGS

FIG. 1 is a general block diagram of a signal transmission system according to one preferred embodiment of the present invention.

FIG. 4 is an illustration of data structure of the embodiment.

FIGS. 8(a), 8(b) and 8(c) are a flow chart of processing programs running on each node and the PC.

DETAILED DESCRIPTION OF THE INVENTION

1. Structure of Embodiment

1.1. General Structure

Figure 2A:
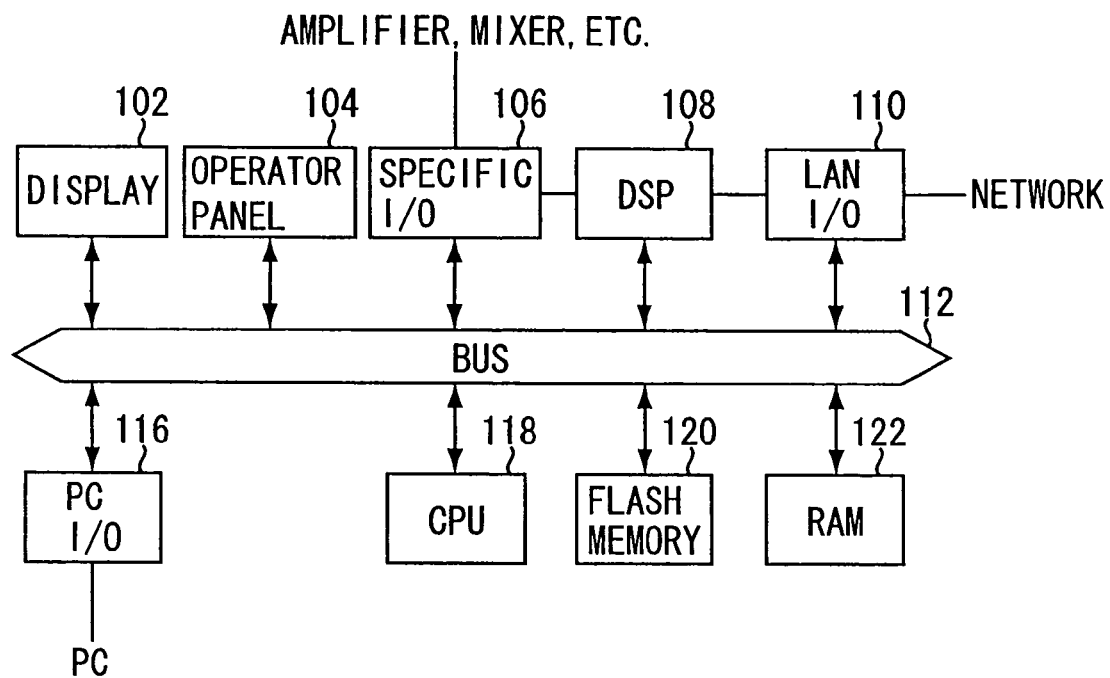
FIGS. 2(a) and 2(b) are a block diagram of each node and a personal computer (PC), respectively, involved in FIG. 1.

The general structure of a signal transmission system according to one preferred embodiment of the present invention will now be described with reference to FIG. 1.

1000 designates an Ethernet network (where Ethernet is a registered trademark), which transmits packets among a plurality of nodes connected to the network 1000. The nodes connected to the network 1000 are broadly divided into two categories: "general-purpose I/O node" and "amplifier I/O node". The former is a node type capable of outputting and inputting audio data through the network 1000, and the latter is a node type which can only receive audio data from the network 1000. On the network 1000, it is possible to connect up to "eight" general-purpose I/O nodes and "16" amplifier I/O nodes.

In the example shown, "two" general-purpose I/O nodes 1100 and 1200 and "two" amplifier I/O nodes 1500 and 1600 are connected to the network 1000. Then, a microphone 1102 and a recorder 1104 are connected to the general-purpose I/O node 1100, a mixer 1202 is connected to the general-purpose I/O node 1200, and a microphone 1204 and a recorder 1206 are connected to the mixer 1202.

On the other hand, two or more amplifiers 1502-150$n$ are connected to the amplifier I/O node 1500 so that audio signals outputted from these amplifiers will be sounded through loudspeakers 1512-151$n$. Although the cable that connects the amplifier I/O node 1500 and each amplifier 1502-150$n$ consists of a cable for transmitting analog audio signal from the node to each amplifier, and another cable for performing bidirectional transmission of control signals between the node and each amplifier, it is respectively expressed by one line on the drawing for convenience sake. Here, one amplifier I/O node can convert audio data for a maximum of "16" channels into analog signals from among "four" bundles ("32" channels) of audio data, and output the analog signals, while it can carry out bidirectional transmission of control signals to and from a maximum of "32" amplifiers.

Similarly, the amplifier I/O node 1600 is connected to two or more amplifiers 1602-160$n$, and loudspeakers 1612-161$n$ are connected to these amplifiers, respectively. In the embodiment, a personal computer (PC) for monitoring and control of the signal transmission system is also connectable to one or more of the nodes. In the example shown, PCs 1910 and 1920 are connected to the general-purpose I/O node 1100 and the amplifier I/O node 1600, respectively.

1.2. Structure of Each Node

Figure 2B:
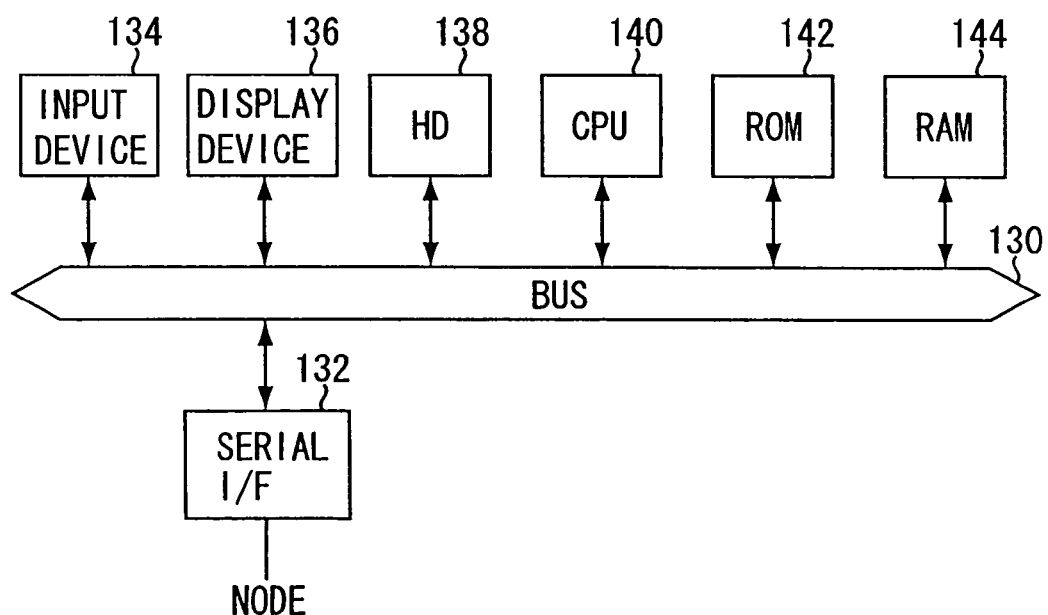

Referring next to FIG. 2($a$), the detailed structure of each node will be described.

As shown in the figure, 102 designates a display that shows various kinds of information to a user. 104 is an operator panel for setting various kinds of information. Since the display 102 and the operator panel 104 are of simple structure, detailed settings for each node or display of the detailed settings are made through the PC 1910 or 1920. 106 designates a unique I/O part that is constructed according to the application purpose of each node. For example, for each of the general-purpose I/O nodes 1100 and 1200, an AD converter, a DA converter, a digital I/O, etc. are provided in the unique I/O part 106 so that a digital signal or analog signal can be inputted and outputted to and from a mixer or the like. On the other hand, for each of the amplifier I/O nodes 1500 and 1600, a DA converter for supplying an analog signal to each amplifier and a serial interface for exchanging a control signal with the amplifier are provided in the unique I/O part 106.

110 designates a LAN I/O part that performs input and output of packets of audio data and control data to and from the network 1000. 108 is a DSP that makes mutual conversions between an audio signal or control signal and an audio data packet or control data packet based on a protocol to be described later. 116 is a PC I/O part, which performs data communication with the PC when the above-mentioned PC 1910 or 1920 is connected. 118 is a CPU that controls each part of the node through a bus 112 based on a control program stored in a flash memory 120. 122 is a RAM that is used as a work memory of the CPU 118.

1.3. Structure of Each Personal Computer

Referring next to FIG. 2($b$), the structure of each PC will be described. As shown in the figure, 134 designates an input device that is made up of a character-input keyboard with a mouse or the like. 136 is a display unit that shows various kinds of information to the user. 138 is a hard disk that stores programs, such as an operating system and an application program (to be described later in detail) for controlling the signal transmission system. 140 is a CPU that controls the other components through a bus 130 based on these programs. 142 is a ROM that stores an initial program loader and the like. 144 is a RAM that is used as a work memory of the CPU 140. 132 is a serial interface that is connected to the PC I/O part 116 of either of the above-mentioned nodes.

2. Data Structure of Embodiment

Configuration information 400 shown in FIG. 4 is stored in the RAM 122 of each node and the hard disk 138 or the RAM 144 of each PC as information for sharing the state of the signal transmission system. Then, the synchronous control of the configuration information 400 stored at each node is carried out by performing processing to be described later so that the identical contents will be shared among the nodes. The configuration information 400 is divided into "24" node regions 400-1 to 400-24. As mentioned above, it is possible to connect up to "eight" general-purpose I/O nodes and "16" amplifier I/O nodes on the network 1000. Therefore, "24" regions corresponding to the maximum number of nodes are pre-allocated, regardless of the actual number of connected nodes, in preparation for the case where the maximum number of nodes are connected.

In the node region 400-1, 404 is an RO (Read Only) block for storing Read-only data that does not allow the PC to instruct any state change. 406 to 410 are RW blocks for storing data that allow the PC to write data for setting a state and read the data for checking the state. Further, 412 is a physical quantity block for storing various physical quantities other than the temperature of a corresponding node, that is, input voltage to an amplifier, output voltage from the amplifier, output power of the amplifier, output impedance of the amplifier, etc. This physical quantity block 412 is also the "Read Only" block that allows only the reading of data for checking the state. Further, 402 is a CRC block for storing a CRC code (error-checking code) allotted to each of the above-mentioned blocks 404-410, and a MAC address of the node concerned. In other words, CRC codes corresponding to respective blocks 404 to 410, that is "four" kinds of CRC codes, are stored in the CRC block 402.

Here, one of the node regions 400-1 to 400-24 of a certain node represents its own node information, and if it is 400-$j$, the node region 400-$j$ is called the "own node region." Further, since the other node regions 400-1 to 400-($j$−1), and 400-($j$+

1) to 400-24 express the states of the other nodes, they are called the "other node regions."

Data stored in the above-mentioned blocks 404 to 410 vary according to the kind of node. First suppose that the node region 400-1 is a region associated with a general-purpose I/O node. In this case, information for specifying the source of a word clock for the general-purpose I/O node concerned is stored in the RO block 404. The bundle number of the bundle inputted and outputted from the node is stored in the RW block 406. Correspondences between channels of analog or digital audio signals inputted and outputted from the outside to the node concerned and net channels (channels in the bundles inputted and outputted to and from the network 1000) are stored in the RW block 408. The name (character string) of the general-purpose I/O node is stored in the RW block 410.

Suppose further that the node region 400-1 is a region associated with an amplifier I/O node. In this case, the temperature of each of the amplifiers connected to the node concerned, information as to whether the maximum "32" amplifiers controlled by the node are in an operable state, and information as to whether a warning is outputted from any of these amplifiers are stored in the RO block 404. The bundle numbers of up to "four" bundles (corresponding to 32 net channels) received by the amplifier I/O node concerned are stored in the RW block 406. Information for specifying the channel number of the DA converter corresponding to each channel that is converted to an analog signal is stored in the RW block 408. The name (character string) of the amplifier I/O node is stored in the RW block 410.

Then, among the physical quantities on each of the amplifiers connected to the amplifier I/O node, infrequently-changing physical quantities such as the temperature of each amplifier are stored in the RO block 404, and frequently-changing physical quantities (voltage, impedance, etc.) are stored in the physical quantity block 412.

3. Data Transmission Protocol

Figure 3A:
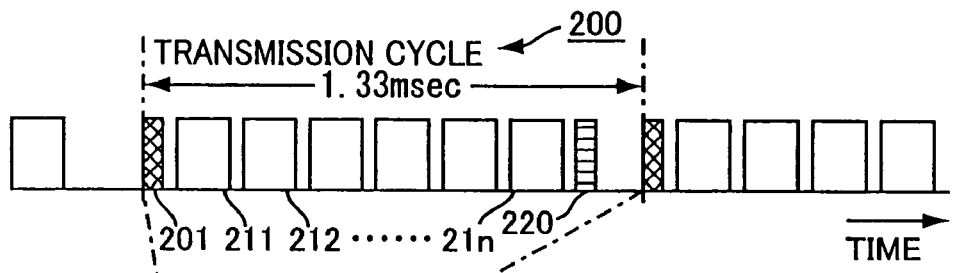
FIGS. 3(a), 3(b) and 3(c) are a timing chart of the embodiment.
Figure 3B:
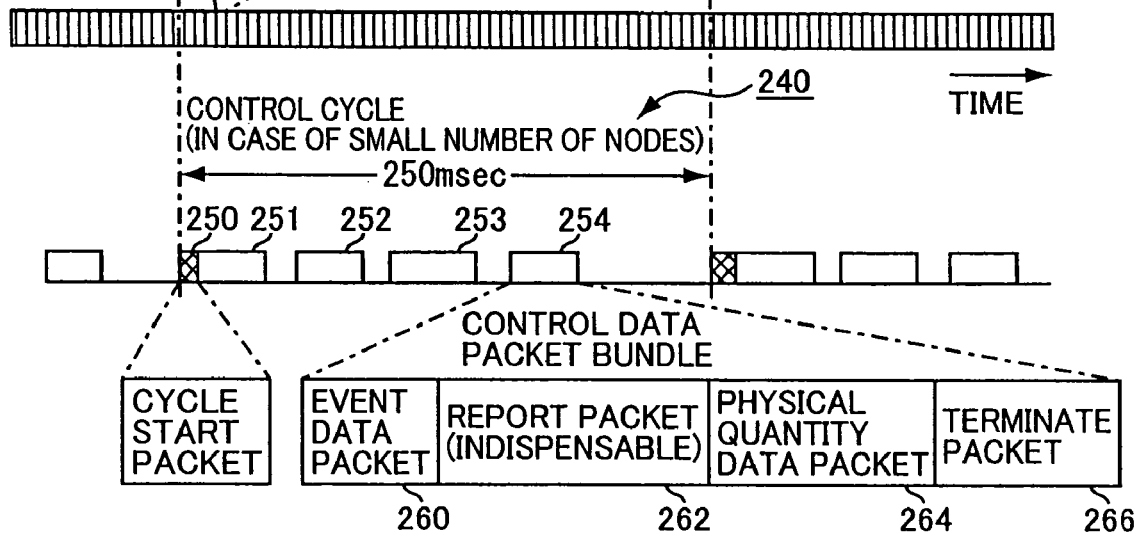

As mentioned above in connection with FIG. 3(a), Cobra-Net allocates a serial communication period in each transmission cycle so that the serial communication packet 220 can be transmitted. Therefore, in the embodiment, a further upper layer (control layer) is formed from a sequence of transmission cycles 200 to transmit various kinds of control signals through this control layer. A protocol for this control layer will be described with reference to FIG. 3(b).

In the control layer, various kinds of control data are transmitted at intervals of 250 msec as "control cycle 240." Then, one of the nodes is set as a special node (called the "conductor node") for managing the control cycle 240. The conductor node may be the above-mentioned "conductor" node or any other node. At the beginning of each control cycle 240, the conductor node outputs a cycle start packet 250 to the network 1000. Subsequently, control data packet bundles 251-254 are outputted to the network 1000 one by one from the respective nodes.

The number of control data packet bundles is the same as the number of nodes ("Four" in the example of FIG. 1) connected to the network 1000, and each node outputs a control data packet bundle once in each control cycle 240. The first control data packet bundle 251 is a control data packet bundle outputted from the conductor node. Therefore, the control data packet bundle 251 is outputted immediately after the cycle start packet 250 is outputted. On the other hand, the subsequent control data packet bundles 252-254 are control data packet bundles outputted from the nodes other than the conductor node, and these packet bundles are outputted at predetermined packet intervals in order to prevent a collision among packet bundles.

Each of the control data packet bundles consists of an event data packet 260, a report packet 262, a physical quantity data packet 264, and a terminate packet 266. Among these, the report packet 262 and the terminate packet 266 are indispensable packets, and the other packets are added as needed.

Figure 3C:
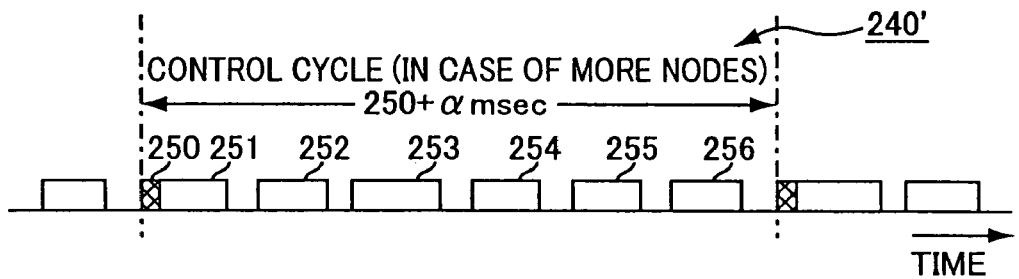

Since the control cycle 240 is set "250 msec" at the shortest interval, if the number of connected nodes increases as shown in FIG. 3(c), it will become longer than "250 msec." However, the period of the control cycle 240 is never shorter than "250 msec." This is because at least "250 msec" is pre-allocated as a time period for which each node collects its own node state every control cycle 240 to report it to the other nodes.

3.1. Cycle Start Packet 250

The details of each packet mentioned above will be described below. The cycle start packet 250 consists of the following data:

(1) Output Sequence of Packet Bundles from Respective Nodes

As mentioned above, the control data packet bundles 251-254 are outputted one by one from each node in the control cycle 240, and the output sequence of each node is specified in the cycle start packet 250.

(2) Listing of Physical Quantities to be Outputted from Each Node

As will be described later in detail, each node can transmit each of the control data packet bundles 251-254 including physical quantities such as the temperature, voltage, impedance, etc. of each of the amplifiers connected to its own machine. Among the physical quantities to be outputted, frequently-changing physical quantities are specified in the even data packet 260 outputted primarily from a PC-connect node to which a PC is connected. However, if each of the other nodes recognizes the physical quantities to be outputted based on the event data packet 260 from the PC-connect node, packet capturing loss may occur due to a communication error etc. Therefore, in the embodiment, a "currently displayed list" that is a list of physical quantities to be outputted is included in the cycle start packet 250 so that the conductor node will collectively manage the specifications of physical quantities to be outputted from each node.

3.2. Event Data Packet 260

The event data packet 260 consists of the following data:

(1) Instruction Data

As will be described later in detail, if a node transmitting a control data packet bundle (hereinafter called a "transmit node") is connected to a PC, the user can instruct not only the transmit node but also all the nodes through the PC to change all state settings (data stored in the node regions RW blocks 406 to 410 of each node). In this case, state changes are instructed from the transmit node to the other nodes in which the states should be changed. The data for giving the instructions is called "instruction data." When the state of a node to which the PC is connected (hereinafter called the PC-connect node) is changed by the PC, the instruction data is not outputted from the node concerned. Further, when a monitoring point of a physical quantity (a desired physical quantity at a desired node) is specified by the PC, the monitoring point is notified to the conductor node, and as mentioned above, it is then notified to each of the other nodes through the cycle start packet 250. Since any nodes other than the conductor node may be promoted to the conductor node, it is advisable to store at each node the monitoring point notified from the PC or through the cycle start packet 250.

(2) Change Data

When a node receives the instruction data and changes its node settings, the changed node settings are notified to all the nodes. When the node to which the PC is connected is instructed by the PC to change its own node settings, the changed node settings are also notified to the other nodes. Further, when a node detecting an infrequently-changing physical quantity such as the "temperature" of an output-stage amplifier finds a change in the detected physical quantity, the changed physical quantity is notified to the other nodes. Data for making these notifications are called "change data." In other words, when any data stored in the blocks 404-410 of the own node region 400-*j* is changed, each node must notify its state change to the other nodes by sending the change data. This must be performed so that the contents of the node region blocks 404-410 of each node will be synchronized with those stored in the PC.

(3) Request Data

Suppose that the own node region of a first node is 400-*j*. In this case, if a contradiction arises between the contents of the CRC block 402 in any of the other node regions, 400-*k* (where k takes on values from 1 to (j−1) and (j+1) to 24) and the CRC calculation results of other blocks 404 to 410 of node region 400-*k*, it means that an error has occurred in the contents of blocks 404-410 of the other node region 400-*k*. In such a case, when the first node turns into the transmit node, it sends, to a second node corresponding to the other node region 400-*k* in which the error has occurred, a request to transfer a block(s) involved with the error. Data for making such a request is called "request data."

3.3. Report Packet 262

The report packet 262 consists of the following data:

(1) Contents of CRC Block 402 Related to Transmit Node

The CRC block 402 in the own node region 400-*j* of the transmit node is always included in the report packet 262 and transmitted every control cycle 240. Thus the report packet 262 is an indispensable packet and has to be generated every control cycle 240. When receiving the CRC code, the other nodes can check whether the correct data related to the transmit node is stored in the configuration information 400 on each of the other nodes.

(2) Contents of Other Blocks 404-410 Related to Transmit Node

As mentioned above, when data stored at a first node indicates that an error has occurred in any of the blocks in the node region related to a second node, request data is sent from the first node to the second node. After receiving the request data, once the second node has turned into the transmit node, the contents of the requested block are added to the report packet 262.

3.4. Physical Quantity Data Packet 264

When a physical quantity to be outputted is specified by the cycle start packet 250, the value of the physical quantity specified from among the frequently-changing physical quantities, such as input voltage to an amplifier, output voltage of the amplifier, and the output impedance of the amplifier, is included in the physical quantity data packet 264, and outputted every control cycle 240. As mentioned above, a change in "temperature" is transmitted as change data only when the change occurs. Since the "temperature" change does not often occur, an enormous amount of data will go to waste if the value of "temperature" is transmitted through the physical quantity data packet 264 every control cycle 240. Thus, from the point of view of reducing the total amount of transmitted data, the value of "temperature" is transmitted only when it changes.

3.5. Terminate Packet 266

The terminate packet 266 is outputted in order to notify the other nodes of the completion of packet transmission by the current transmit node.

Figure 6:
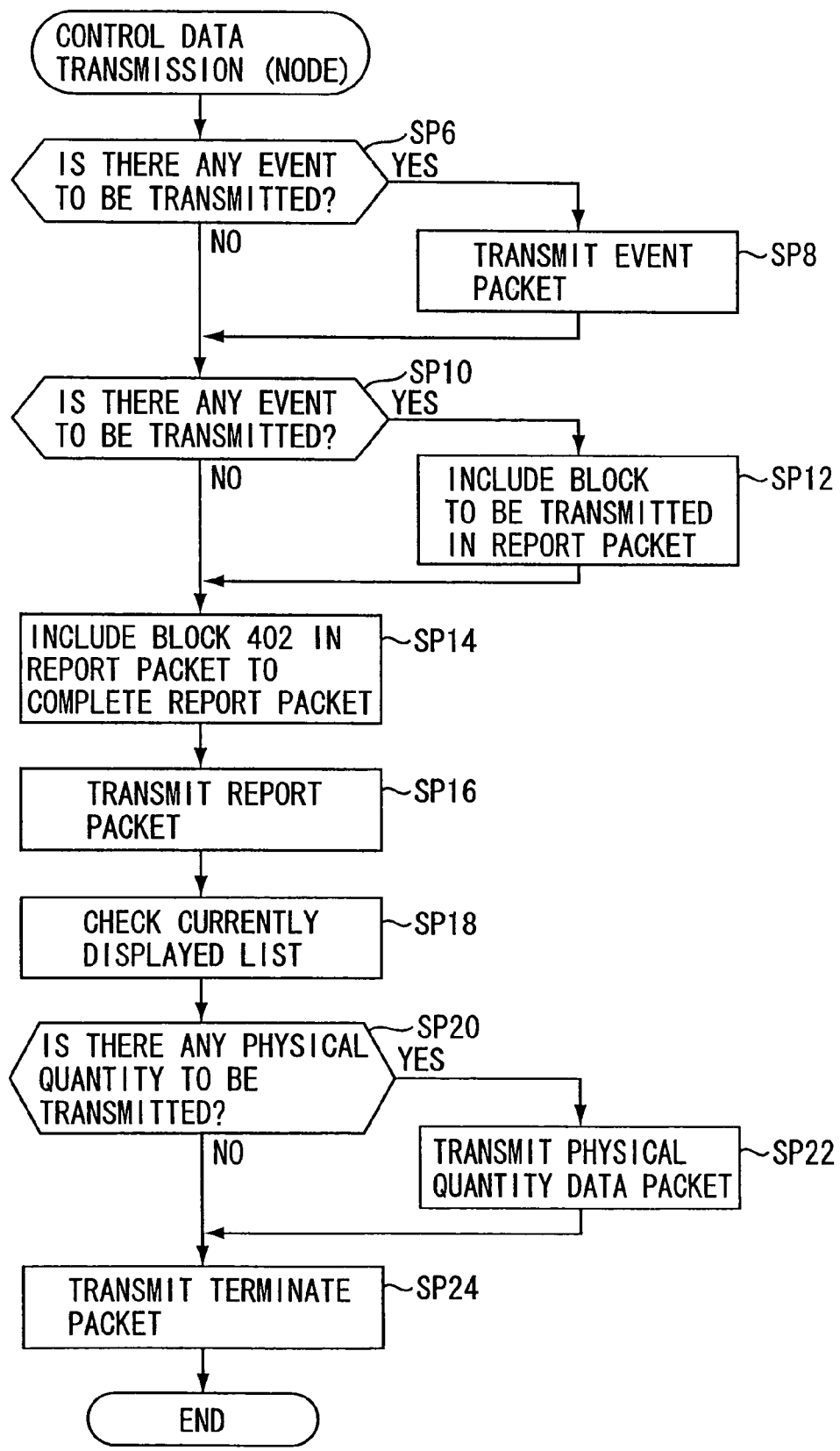
FIG. 6 is a flow chart of a control data transmitting routine performed on each node.

4. Operation of Embodiment 4.1. Control Data Transmission at Node (FIG. 6)

The operation of the embodiment will next be described. First of all, when each node goes into a state in which each of the control data packet bundles 251-254 is to be transmitted to the other nodes through the network 1000, a control data transmitting routine shown in FIG. 6 is started. The following three states (1), (2) and (3) can be specifically considered to be "the transmission state" in which each of the packet bundles "is to be transmitted."

(1) Immediately after Output of Cycle Start Packet 250:

The conductor node outputs the cycle start packet 250 every control cycle 240 based on its own node clock. Such a conductor node outputs the control data packet bundle 251 immediately after outputting the cycle start packet 250.

(2) After Detection of Terminate Packet 266:

As mentioned above, the sequence or order by which each node outputs the control data packet bundle is indicated in the cycle start packet 250. Therefore, the nodes other than the conductor node output their control data packet bundles when a predetermined packet interval has elapsed after the immediately preceding node outputted the terminate packet 266.

(3) When Receiving Instructions from Conductor Node:

The conductor node keeps track of whether each node is outputting the control data packet bundle in the correct order. If a packet bundle to be outputted from a correct node cannot be detected, the next node determined in the output order will be instructed to output the packet bundle. In such a case, the node instructed outputs the control data packet bundle immediately.

Then, when the processing proceeds to step SP6 in FIG. 6, it is determined whether there is any event data to be transmitted. In other words, when any state change (including a "temperature change" the measurement of which has been instructed) has occurred at the transmit node, the change data needs outputting. When any other node is required to change its state in accordance with instructions from the PC, the instruction information needs outputting. Further, when a contradiction arises between the CRC codes, the request data needs outputting. If the case falls into any of these categories, the answer to this step SP6 is determined as "YES" and the processing proceeds to step SP8. In step SP8, the event data packet 260 is created based on corresponding event data and transmitted to the network 1000.

Then, when the processing proceeds to step SP10, it is determined whether any of the blocks 404-410 in the own node region 400-*j* is to be transmitted, that is, whether the "request data" is received from any of the other nodes. When the answer is "YES" here, the processing proceeds to step SP12, and one or more blocks for which the request data has been sent are listed as blocks to be included in the report packet 262.

Next, when the processing proceeds to step SP14, the CRC block 402 in the own node region 400-*j* is added to the list of blocks to be included in the report packet 262. Therefore, when the answer to step SP10 is "NO," only the CRC block 402 is listed. Next, based on all listed blocks, the report packet 262 is created to include those contents. Next, the processing proceeds to step SP16 in which the created report packet 262 is outputted through the network 1000.

Next, when the processing proceeds to step SP18, the contents of the "currently displayed list" received from the conductor node are checked. In other words, since all the physical quantities to be outputted from each node are included in the "currently displayed list," all "physical quantities but temperature to be outputted from its own node" are searched out. Next, the processing proceeds to step SP20, and it is determined based on the check results in step SP18 whether there is any physical quantity to be transmitted. If the answer is "YES" here, the processing proceeds to step SP22, in which the physical quantity data packet 264 is created based on the physical quantity to be transmitted and outputted to the network 1000. Next, the processing proceeds to step SP24 in which the terminate packet 266 is outputted to the network 1000. The routine is ended after the above processing step.

4.2. Control Data Reception at Node (FIG. 7)

Figure 7:
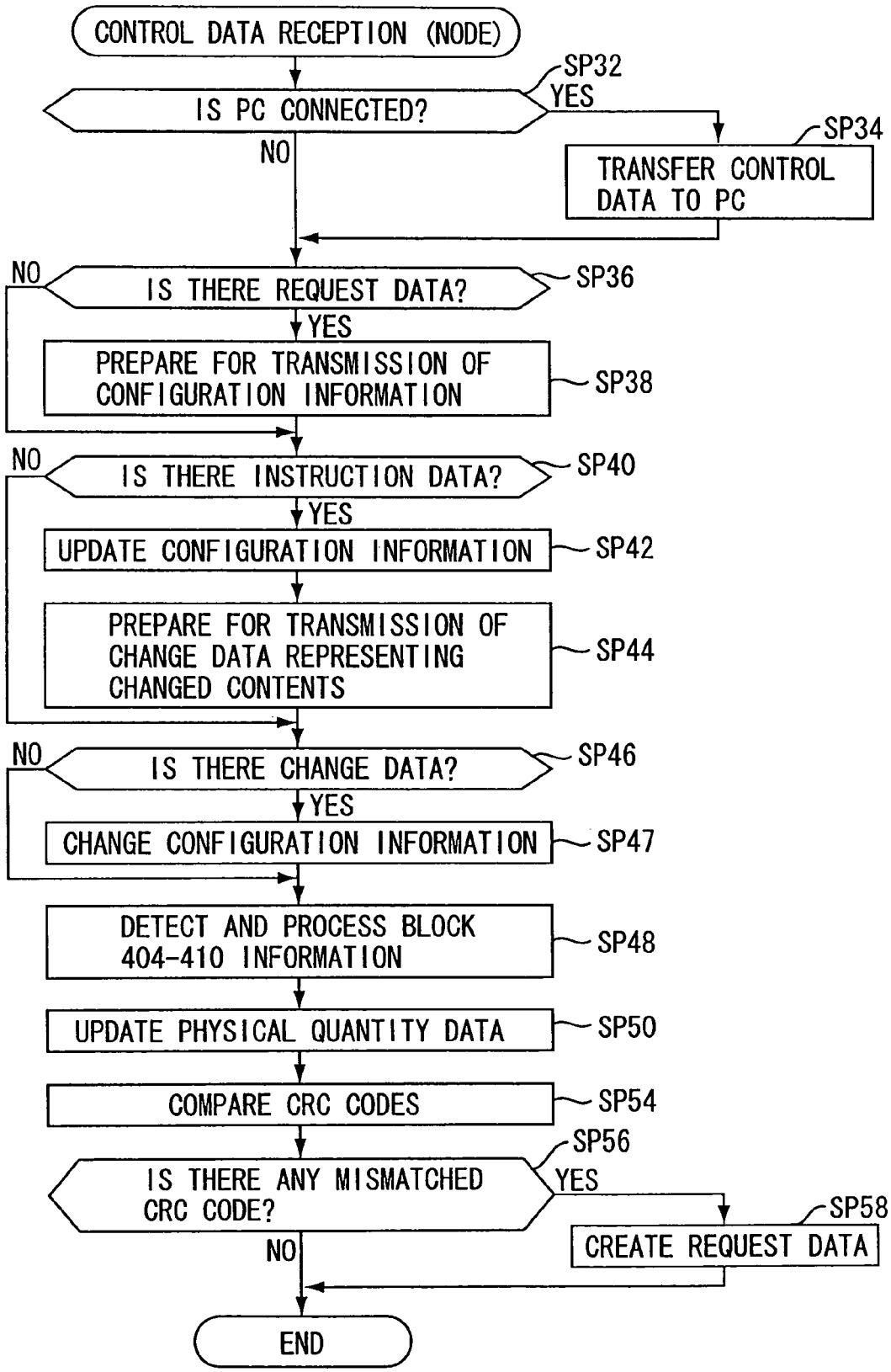
FIG. 7 is a flow chart of a control data receiving routine performed on each node.

Next, when any control data packet bundle is received at any of the nodes other than the transmit node through the network 1000, a control data receiving routine shown in FIG. 7 is started at each node (receive node) that has received the packet bundle. As shown, when the processing proceeds to step SP32, it is determined whether the PC is connected to the own node PC I/O part 116. When the answer is "YES" here, the processing proceeds to step SP34 in which various kinds of control data are transferred to the PC. The control data transmitted to the PC are classified into "data to be transmitted immediately," and "data to be transmitted after a predetermined waiting period has elapsed," and transmitted at proper timings according to this classification. The classification method for the control data and the criteria for classifying will be described later.

Next, the processing proceeds to step SP36, and it is determined whether the "request data" to the own node is included in the packet bundle received. If the answer is "YES" here, the processing proceeds to step SP38, in which the transmission of a block requested from among the blocks 404-410 in the own node region 400-j is prepared. In other words, if the own node turns into the transmit node in the next cycle, the block requested at this time will be added to one or more blocks to be included in the report packet 262 at the above-mentioned processing step SP12.

Next, the processing proceeds to step SP40, and it is determined whether the "instruction data" to the own node is included in the packet bundle received. If the answer is "YES" here, the processing proceeds to step SP42, in which the contents of the own node region 400-j are altered based on the "instruction data." For example, if the instruction data is to change the state of any of the amplifiers connected to the own node, a control signal is outputted to the amplifier and the like to realize such a state change. Next, the processing proceeds to step SP44, in which the transmission of the altered contents of the own node region 400-j is prepared. In other words, if the own node turns into the transmit node in the next cycle, the currently altered contents of the own node region 400-j will be added to the change data to be included in the event data packet 260 at the above-mentioned processing step SP8.

Next, the processing proceeds to step SP46, and it is determined whether the "change data" from the transmit node is included in the packet bundle received. If the answer is "YES" here, the processing proceeds to step SP47, in which the contents of a node region 400-k (where k takes on values from 1 to 24) related to the transmit node are altered based on the change data.

Next, the processing proceeds to step SP48, and it is determined whether any of the blocks 404-410 is included in the report packet 262 received. If it is included, the contents of the received block is written over the corresponding contents in the node region 400-k related to the transmit node. Then, a CRC code corresponding to the altered contents of the changed block 404-410 (that is, the block changed at step SP47 or the block overwritten at step SP48) is calculated, and the calculated CRC code is written over a corresponding portion of the CRC block 402. A common operational formula is used for all the nodes and the PC at the calculation of CRC code, so that any CRC code in the CRC block 402 is uniquely determined once the contents of the blocks 404-410 are determined.

Next, the processing proceeds to step SP50, and it is determined whether the physical quantity data packet 264 is included in the packet bundle received. If it is included, the contents of the packet is written over the physical quantity block 412 in the node region 400-k of the transmit node. Next, the processing proceeds to step SP54, in which CRC codes stored in the CRC block 402 of the node region 400-k related to the transmit node are compared with corresponding CRC codes supplied from the transmit node (included in the report packet 262), respectively.

Next, the processing proceeds to step SP56, and it is determined whether a mismatch is found between the stored CRC codes and the supplied corresponding CRC codes. If a mismatch is found therebetween, it means that incorrect information is stored in the block related to the mismatched CRC code. If the answer is "YES" here, the processing proceeds to step SP58, in which request data for requesting the transmit node to retransmit the block concerned is created and a message indicating the occurrence of a communication error is displayed on the display 102. This request data is outputted at the above-mentioned step SP8 when the own node turns into the transmit node in the next cycle.

If the mismatch between the CRC codes occurs in the RO block 404, the message indicating the communication error may not be displayed on the display 102. On the other hand, no CRC codes are created for the physical quantity block 412. Therefore, even if wrong contents are stored in the physical quantity block 412 due to a communication error or the like, the erroneous state will continue until the block is updated in the next or later cycle. Thus the frequency of outputting request data can be reduced to minimize the total amount of control data on the network 1000.

A new node is hot-pluggable to the network 1000. In this case, all regions but the own node region 400-j in the configuration information 400 of the new node are filled with blanks, and a CRC code indicating that each block is empty is recorded in the CRC blocks 402 of the regions other than the own node region. Therefore, since the CRC code recorded on the new node never matches with any other CRC codes received from the other nodes on the network 1000, the retransmission of the configuration information (blocks 404-410) representing the all state settings related to the transmit node is requested each time the new node receives a CRC code from any of the other nodes. Such a request allows the new node to receive the configuration information on all the nodes sequentially from the other nodes. Then, since the received information is recorded on the new node as the configuration information 400, the new node can automatically hold the configuration information of all the nodes on the network 1000.

4.3. Connection of PC

When the PC 1910 or 1920 is connected to any node and a predetermined application program is started on the PC, a "transfer command" is first executed. Then, when the command is executed, the configuration information 400 stored at the PC-connect node is transferred to the PC. This allows the PC to show various screens so that the user can refer to the configuration information 400. Thus the user can grasp the state of the signal transmission system and instruct a state change(s) through these screens.

4.4. Screen Select Event (FIG. 8(*a*) and FIG. 5)

The above-mentioned application program allows the user to select and display any of the various screens (windows) using the input device 134 so as to look into the configuration information 400 stored in the PC. The occurrence of this screen select event invokes a screen select event generating routine. As shown in FIG. 8(*a*), when the processing proceeds to step SP70, it is determined whether the selected screen is a screen for displaying physical quantities (temperature, voltage, impedance, etc.).

When the answer is "YES" here, the processing proceeds to step SP72 in which the selected screen is displayed on the display unit 136. Next, the processing proceeds to step SP74 in which a specification event for specifying physical quantities to be displayed on the screen is transmitted. If the answer to step SP70 is "NO," the processing proceeds to step SP76 in which the selected screen is displayed on the display unit 136. Next, the processing proceeds to step SP78 in which various other kinds of processing are executed and the routine is ended.

Here, a screen for displaying the "physical quantities" will be described by taking as an example a group display screen (see FIG. 5) on which two or more channels of amplifiers connected to amplifier I/O node are grouped and the operating state of the two or more channels are displayed on a group basis. First, in the embodiment, the monitoring points of physical quantities are classified into two or more "groups." In the figure, 350 to 354 designate tags and the user can click on any tag to select a corresponding group. 300 designates a display window for showing the physical quantities belonging in the selected group. 300-1, 300-2, ... designate monitoring point frames, and each monitoring point frame indicates two or more physical quantities each corresponding to a monitoring point.

In the monitoring point frame 300-1, 302 is a channel indication part that indicates a character string specifying to which channel the indications in the monitoring point frame 300-1 are made, for which amplifier the channel is, and to which amplifier I/O node the amplifier is connected. In the character string "AN1-3-2," the first two alphabetical letters "AN" denotes an "amplifier I/O node," and the first number immediately after "AN" denotes the serial number of the "amplifier I/O node." The second number "3" denotes the serial number of an amplifier connected to the amplifier I/O node, and the last number denotes the channel number of the amplifier.

304 designates a name indication part that indicates a character string representing the name of the amplifier assigned by the amplifier manufacturer. 306 is a power button for switching the power of the amplifier between the "ON" state and the "STAND-BY" state, indicating a character string representing the state. 308 is a channel name indication part that indicates any channel name (character string) designated by the user. 310 is a protection indication part. Nothing is indicated in this part in a normal operation, but the character string "PROTECT" is indicated when an amplifier protection system is activated.

312 is an output clip indication part that lights up when an output signal for the channel concerned is clipped. 314 is a power output meter that indicates the output level ("power" or "voltage") of the output signal. 316 is an impedance indicator that indicates the numerical value of load impedance of the channel concerned. 318 is a temperature meter that indicates the temperature of an output-stage amplifier for the channel concerned. 320 is an input meter that indicates the input level to the channel concerned in decibels. 322 is an ATT fader indicates the setting state of the attenuation factor of the input signal to the channel. The ATT fader can also be used to change setting state of the attenuation factor by dragging it with the mouse.

324 is a phase button that switches the output phase of the channel between "NORMAL" and "REVERSE" with the click of the mouse. 326 is a mute button that toggles the mute (attenuation of output level) on and off for the channel with the click of the mouse. Among the above-mentioned indication contents, those of the power output meter 314, the impedance indicator 316, and the input meter 320 are based on the contents stored in the physical quantity block 412 in the own node region 400-*j* of the amplifier I/O node, while the indication of the temperature meter 318 is based on the RO block 404. The other indication contents are based on any of the RW blocks 406-410. In other words, the amplifier I/O node collects various setting states and physical quantities from the amplifiers connected, and stores the contents in the own node region 400-*j* of the amplifier I/O node concerned. Then, when the contents of the region are reflected in the configuration information 400 on the PC through the PC-connect node, the contents of the display window 300 on the PC are updated.

The monitoring point frame 300-2 and the like have the same indicator structure as the monitoring point frame 300-1. The user has the option of selecting an amplifier channel belonging to each group. In addition, different nodes and different amplifier channels can be shown in the same display window 300.

4.5. Setting Change Event (FIG. 8(*b*))

Figure 5:
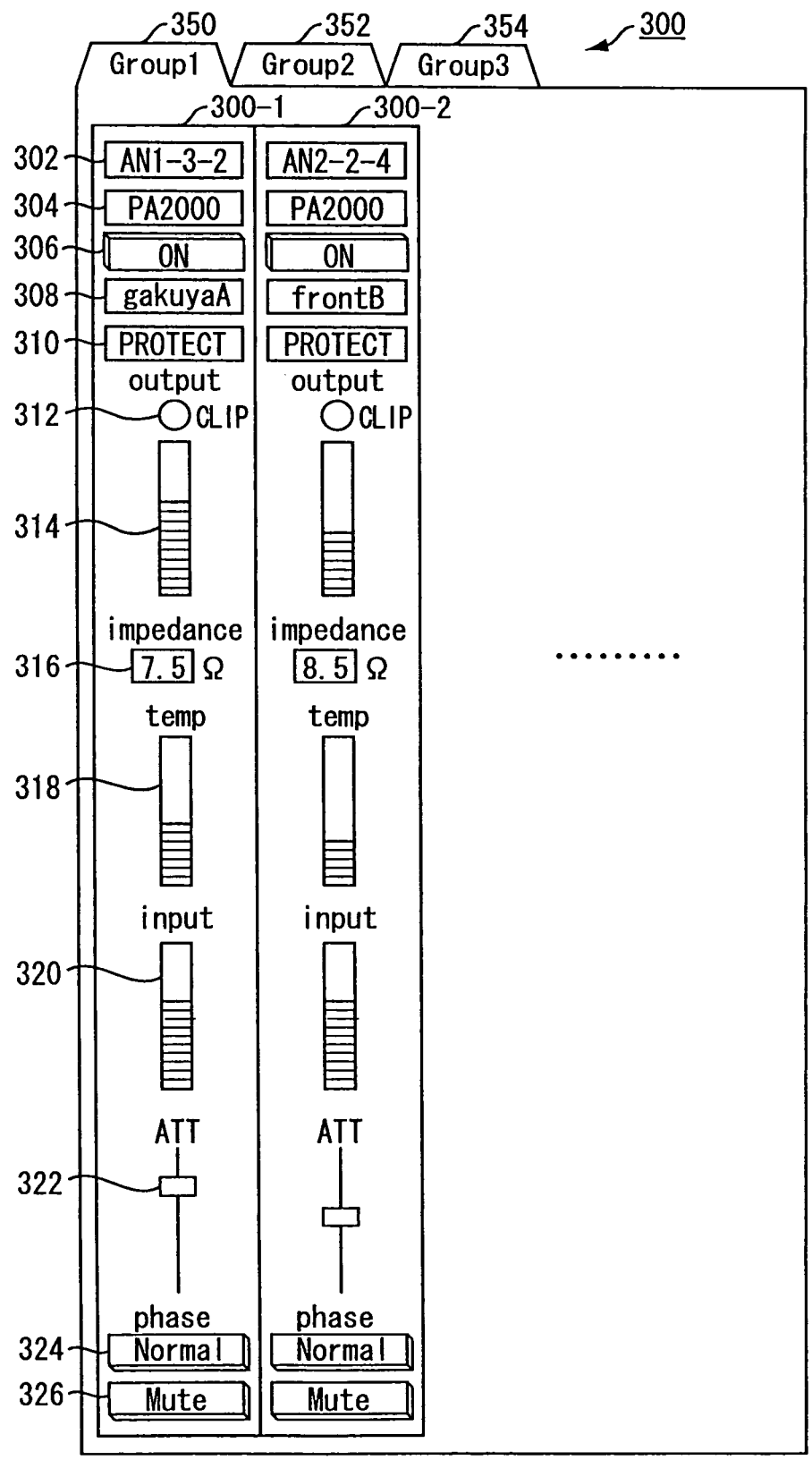
FIG. 5 is an illustration showing a display example on the PC.

As mentioned above, the user can operate the PC to control the setting state of each part. In the example of FIG. 5, the setting state corresponding to the ATT fader 322, for example, for a certain channel of an amplifier I/O can be changed by dragging the ATT fader 322 with the mouse. Thus, when an event for changing the state of any node (or an amplifier(s) connected to the node) occurs, a setting change event generating routine shown in FIG. 8(*b*) is started on the PC.

As shown, when the processing proceeds to step SP80, the configuration information 400 in the PC concerned is changed as instructed. For example, suppose that the attenuation factor is set to "10 dB" with the operation of the ATT fader 322. In this case, data indicating "10 dB" is immediately written in a portion corresponding to the amplifier channel concerned in any of the RW blocks 406-410 in the node region related to the amplifier I/O node concerned. Then, a CRC code corresponding to the updated block is recalculated, and the calculation results are written in a corresponding portion of the CRC block 402. Next, the processing proceeds to step SP82 in which the indication contents are updated on the PC based on the updated configuration information 400. In other words, in the above-mentioned example, the "knob" or control of the ATT fader 322 is moved to a position corresponding to "10 dB."

At this time, however, since it is not checked that the amount of attenuation of the channel corresponding to an actual amplifier has been set to "10 dB," the indication is made in the indication part (ATT fader 322 in this case) in a different manner from its normal state (for example, the ATT fader 322 is grayed out or flashes) to indicate that the change is unconfirmed. Next, the processing proceeds to step SP84 in which change instructions indicating the changed contents (target node and amplifier, kind of parameter, amount of change, etc.) are transmitted from the PC to the PC-connect node.

4.6. Setting Change Event (FIG. 8(c))

When receiving the change instructions, the PC-connect node runs a change instruction receiving routine shown in FIG. 8(c). As shown, when the processing proceeds to step SP90, it is determined whether the change instructions received are directed to its own node (or an amplifier or the like connected to its own node). If the answer is "YES" here, the processing proceeds to step SP96 in which a corresponding portion of the own node region 400-j of the PC-connect node concerned is changed.

If the changed portion is in any of the blocks 404-410, a CRC code related to the block concerned is recalculated, and written over a corresponding portion of the CRC block 402. On the other hand, if the change instructions received are directed to an amplifier or the like connected to its own node, the setting state of the amplifier or the like is also changed. Then, change data representing the contents of change concerned is created, and transmitted to the PC which is connected to the PC-connect node. Further, when the PC-connect node turns into the transmit node, the change data is included in the event data packet 260 and transmitted to the other nodes (step SP8 in FIG. 6).

On the other hand, when the answer to step SP90 is "NO," the processing proceeds to step SP92. Here, instruction data for instructing the other node to change the state is created. In this case, the contents of the configuration information 400 are not changed. In other words, when the PC-connect node turns into the transmit node, the instruction data is transmitted to the other nodes to change the state (step SP8 in FIG. 6) so that the configuration information 400 will be changed at the other nodes (steps SP42 and SP44 in FIG. 7). Then, when any of the other nodes turns into the transmit node, change data corresponding to the changed state is transmitted from the node concerned to the PC-connect node and the other nodes (step SP8 in FIG. 6). Thus, when receiving the change data (change data related to the changed portion instructed by the instruction data in step SP92), the PC-connect node concerned changes a corresponding portion of the stored configuration information 400 (step SP47 in FIG. 7).

Next, the processing proceeds to step SP94 to start measuring a predetermined period of time. Here, the "predetermined period of time" corresponds, for example, to "four cycles" when the mean value of past control cycles 240 is set as "one cycle." As mentioned above, when a PC-connect node transfers control data received from the network 1000 to the PC, the control data are classified into "data to be transferred immediately" and "data to be transferred after a predetermined waiting period has elapsed." Here, the "data to be transmitted after a predetermined waiting period has elapsed" denotes the "change data related to the changed portion instructed by the instruction data in step SP92," and the "predetermined period of time" is the "predetermined period of time (for example, four cycles) for which time measurement is done at step SP94."

A reason for putting pause to the transfer of data in this way will be described below. First, possible problems that may arise if the transfer is performed without standby time will be described. In the example of FIG. 1, the PC 1910 is connected to the general-purpose I/O node 1100, and the PC 1920 is connected to the amplifier I/O node 1600. Suppose here that the display window 300 shown in FIG. 5 is displayed on both of the PCs 1910 and 1920. Suppose further that the monitoring point frame 300-1 in the window is related to the second channel of the amplifier 1502 connected to the amplifier I/O node 1500. Here, for example, if the ATT fader 322 is set to "10 dB" on the PC 1910, and after a time lag (some 100 msec), the ATT fader 322 is set to "20 dB" on the PC 1920, the following behavior is expected:

(1) First, when an operation event for setting the ATT fader 322 to "10 dB" is detected on the PC 1910, change instructions are transmitted to the general-purpose I/O node 1100.

(2) In response to the change instructions, when the own node for the general-purpose I/O node 1100 turns into the transmit node, instruction data for instructing the amplifier I/O node 1500 to "set 10 dB for the attenuation factor of the second channel of the amplifier 1502" is transmitted to the amplifier I/O node 1500.

(3) Here, when an operation event for setting the ATT fader 322 to "20 dB" is detected on the PC 1920, change instructions are transmitted to the amplifier I/O node 1600.

(4) The amplifier I/O node 1500 controls the amplifier 1502 based on the instruction data from the general-purpose I/O node 1100, and updates the configuration information 400. As a result, change data indicating that "the attenuation factor of the second channel of the amplifier 1502 has been set to 10 dB" is outputted to each of the other nodes.

(5) When receiving the change data, the amplifier I/O node 1600 transfers to the PC 1920 the change data indicating that "the attenuation factor of the second channel of the amplifier 1502 has been set to 10 dB."

(6) Next, when the amplifier I/O node 1600 turns into the transmit node, instruction data for instructing the amplifier I/O node 1500 to "set 20 dB for the attenuation factor of the second channel of the amplifier 1502" is transmitted to the amplifier I/O node 1500.

(7) The amplifier I/O node 1500 controls the amplifier 1502 based on the instruction data from the amplifier I/O node 1600, and updates the configuration information 400. As a result, change data indicating that "the attenuation factor of the second channel of the amplifier 1502 has been set to 20 dB" is outputted to each of the other nodes.

(8) When receiving the change data, the amplifier I/O node 1600 transfers to the PC 1920 the change data indicating that "the attenuation factor of the second channel of the amplifier 1502 has been set to 20 dB."

From the point of view of the PC 1920 on the above-mentioned sequence of operations, it receives the change data indicating that "the attenuation factor has been set to 10 dB" and then the change data indicating that "the attenuation factor has been set to 20 dB" despite the fact that the setting of the attenuation factor to 20 dB was instructed on the PC 1920. As will be described later in detail, after change instructions to change any portion of the configuration information 400 are transmitted to the PC-connect node, each PC keeps track of whether the state of the corresponding portion is changed based on the change data in accordance with the change instructions. Therefore, when being supplied with the change data on "10 dB" with respect to the change instructions on "20 dB," the PC 1920 considers that a communication error has occurred, and a warning about the communication error is given on the PC 1920.

Thus, if no standby time is provided for the transfer of change data corresponding to change instructions, a warning about "occurrence of an error" is frequently given during configuration of the signal transmission system despite the fact that no actual transmission error has occurred. Therefore, in the embodiment, change data corresponding to change instructions is transferred after a predetermined waiting period has elapsed. The "predetermined period of time (e.g., four cycles)" is equivalent to an "estimated value of a time interval after output of change instructions to the nodes other than the PC-connect node from the PC to the PC-connect node until change data corresponding to the change instructions is received."

Further, the meaning of "waiting or putting pause to" is different from the meaning of simply delaying." It means that "when two or more kinds of change data on a corresponding portion are received during standby time, the change data received at the end of the standby time is transferred." In the above-mentioned example, although the PC 1920 sequentially receives change data on "10 dB" and "20 dB," if these change data are received during standby, only the last change data on "20 dB" is transmitted to the PC 1920. Thus, since the PC 1920 receives the change data on "20 dB" with respect to the change instructions on "20 dB," no contradiction arises between the change instructions and the change data.

On the other hand, the PC 1910 also receives change data on "10 dB" and "20 dB" in this order. If the standby time expires after receiving the change data on "10 dB," since the PC 1910 receives the change data on "10 dB" with respect to the change instructions on "10 dB," no contradiction will also arise between the change instructions and the change data. After that, although the PC 1910 receives the change data on "20 dB," this is received as change data that does not correspond to the previously-received change instructions. Thus, in the embodiment, since a predetermined waiting period is provided for the transfer to each PC of the change data on a portion related to the change instructions, when instruction data is transmitted from both the multiple PCs as mentioned above, or when any of the other nodes transmits "request data for requesting a block including data to change the instruction data" immediately after transmission of the instruction data from the PCs, no error is detected, reducing the frequency of occurrence of errors.

4.7. PC Processing Upon Receiving Control Data (FIG. 9)

Figure 9:
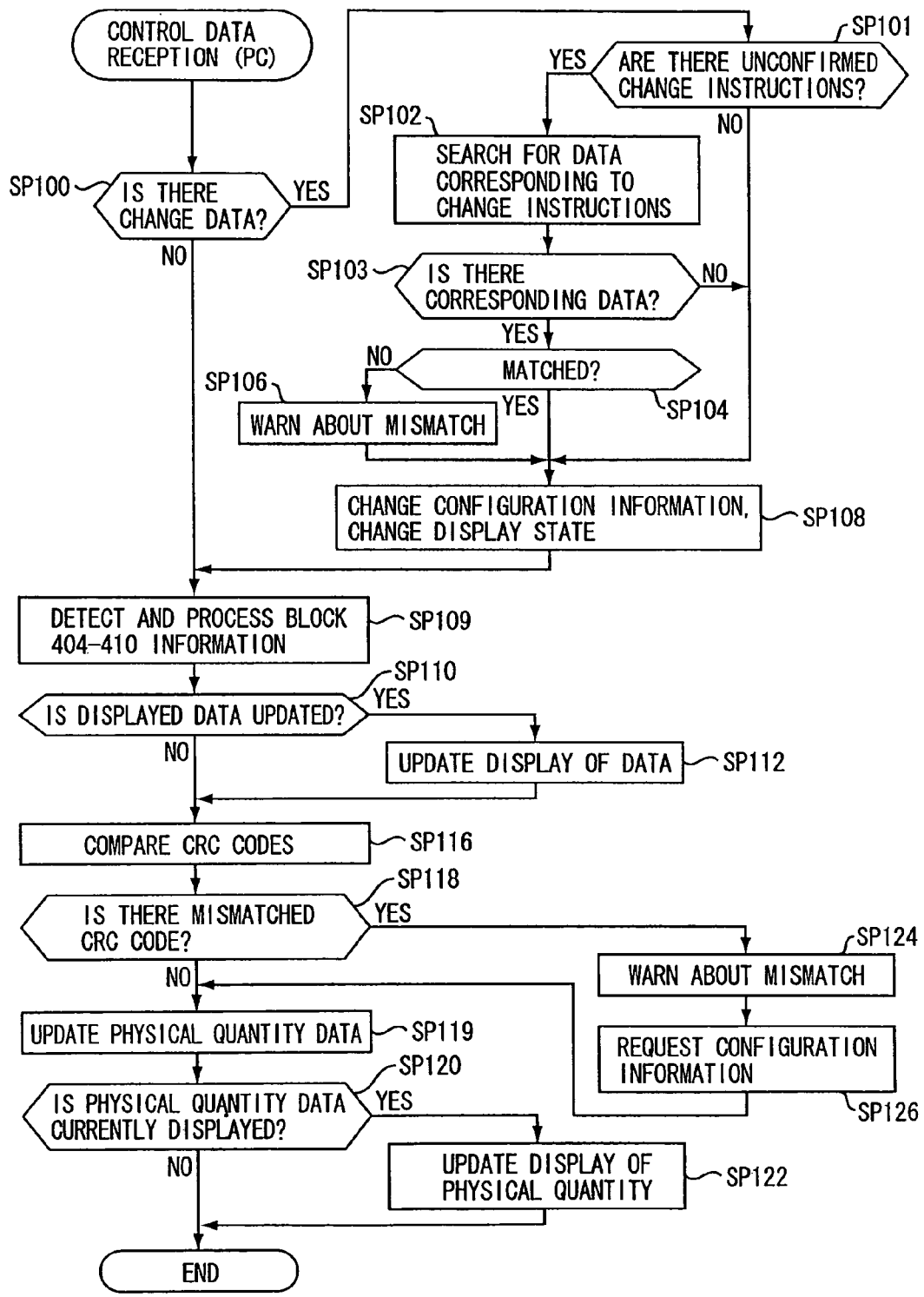
FIG. 9 is a flow chart of a control data receiving routine performed on the PC.

When the control data is supplied from the PC-connect node to the PC in the above-mentioned processing step SP34 (FIG. 7), a control data receiving routine shown in FIG. 9 is started on the PC. As shown, the processing proceeds to step SP100, and it is determined whether change data is included in the control data. If the answer is "YES" here, the processing proceeds to step SP101. In step SP101, it is determined whether change instructions previously outputted to the PC-connect node (step SP84 in FIG. 8(b)) include change instructions, the results of which are unconfirmed. When the answer is "YES" here, the processing proceeds to step SP102, and "change data corresponding to the previously outputted change instructions" that is, "change data received immediately after the change instructions and related to a portion instructed by the change instructions" is searched for from among all the change data received. Next, the processing proceeds to step SP103, and it is determined whether there is "change data corresponding to the change instructions.

When the answer to step SP103 is "YES," the processing proceeds to step SP104. In step SP104, it is determined whether the contents of the change data match the contents of the previously-outputted change instructions. Here, the determination that they "match" with each other indicates that the parameters are changed in accordance with the change instructions, while the determination that they "do not match" with each other indicates that the parameters are not changed in accordance with the change instructions. If the answer is "NO (mismatch)" here, the processing proceeds to step SP106. In step SP106, a warning that "the change data is different in content from the change instructions" is given (for example, a pop-up window is displayed). In other words, an operation mode for determining whether such a warning display is made can be preset on the PC. Thus, the warning display is made only when the operation mode for making such a display is preset.

As described in step SP80 (FIG. 8(b)), the configuration information 400 on the PC has already been updated to indicate the contents in which the change instructions is reflected. Therefore, a matching determination in step SP104 may be made by comparing data (the contents of the blocks 404-410 and the change data), or by comparing CRC codes (the CRC code in the CRC block 402 and a CRC code newly determined based on the change data).

When the answer to step SP101 or SP103 is "NO," or when the answer to step SP104 is "YES," or after completion of the warning processing at step SP106, the processing proceeds to step SP108 in which the contents of the configuration information 400 in the PC are changed based on the change data received. In other words, not only the contents of the blocks 404-410 in the node region 400-k of the transmit node, but also the corresponding CRC code in the CRC block 402 are updated. Since the processing step SP108 is executed regardless of the determination results in step SP104, even if a contradiction arises between the change instructions and the change data, the change data will always be considered correct. The display state on display unit 136 is also updated based on the change data.

As previously described in step SP82(FIG. 8(b)), the indication that indicates settings corresponding to unconfirmed change instructions was made in a different manner from the normal state. Therefore, if data corresponding to the unconfirmed change instructions is included in the change data received in the current cycle, the unconfirmed indication state is returned to the normal indication state.

Next, the processing proceeds to step SP109, and it is determined whether any of the blocks 404-410 is included as the report packet 262 in the previously-received control data. If included, the contents of the block received is written over a corresponding portion in the node region 400-k related to the transmit node. Then, a CRC code is calculated for the block changed from among the blocks 404-410 (that is, the block changed in step SP108 or the block overwritten in step SP109), and the calculated CRC code is written over a corresponding portion in the CRC block 402.

Next, the processing proceeds to step SP110, and it is determined whether the data on the display unit 136 is updated by data updating in the immediately preceding step SP109 (that is, data updating based on the report packet 262). If the answer is "YES" here, the processing proceeds to step SP112, and the displayed contents of the data is updated based on the control data received in this cycle. Next, the processing proceeds to step SP116 in which the two or more CRC codes stored in the CRC block 402 are compared with corresponding two or more CRC codes (included in the report packet 262) supplied from the transmit node, respectively. Next, the processing proceeds to step SP118, and it is determined whether there is a mismatch between CRC codes. If the answer is "YES" here, the processing proceeds to step SP124, and the occurrence of a mismatch between CRC codes is indicated on the display unit 136. The indication may be made to determine a block in which a mismatch has occurred.

Next, the processing proceeds to step SP126. In step SP126, a request for retransmission of data on a portion in which a mismatch between CRC codes has occurred is outputted to the PC PC-connect node.

Next, the processing proceeds to step SP119, and it is determined whether the physical quantity data packet 264 is included in the control data received. If included, the contents of the packet are written over the physical quantity block 412 in the node region 400-k of the transmit node. Next, the processing proceeds to step SP120, and it is determined whether any of frequently-changing physical quantities is currently displayed on the display unit 136. If the answer is "YES" here, the processing proceeds to step SP122 in which the displayed contents are updated based on the physical quantities stored in the configuration information 400. Here, from among the physical quantities currently displayed, frequently-changing physical quantities are specified in the currently-displayed list in the cycle start packet 250. In other words, the physical quantities to be updated on the display screen are the physical quantities transferred as the physical quantity data packet from the corresponding transmit node according to the currently displayed list. In addition, since infrequently-changing physical quantities are stored in the RO block 404 in each node region, their displayed contents are updated in step SP108 or SP112.

4.8. Processing at Conductor Node 4.8.1. Failure Detection of Existing Node

The conductor node keeps track of whether each of the other nodes is transmitting each control data packet bundle in the correct transmission sequence as instructed in the cycle start packet 250. After output of the terminate packet 266 from a first node, if no control data packet bundle is not outputted from a second node within a predetermined period of time, it can be considered that any failure has occurred to the second node (such as disconnection from the network 100). This second node is called the "failed node."

Figure 10A:
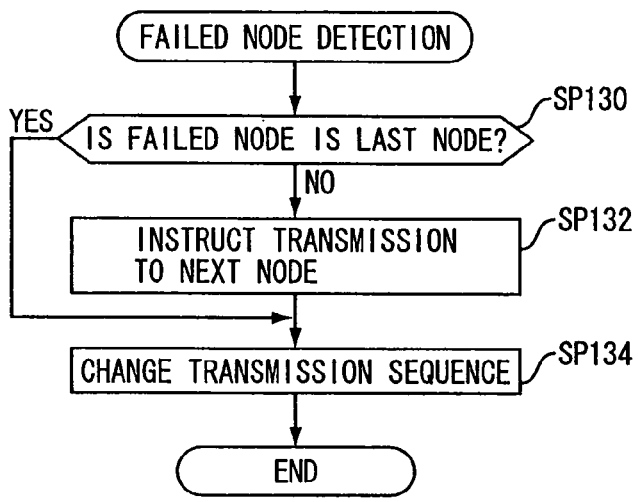
FIGS. 10(a), 10(b) and 10(c) are a flow chart of processing programs running on a conductor node.
Figure 10B:
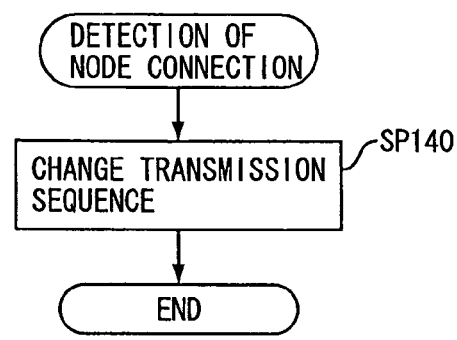
Figure 10C:
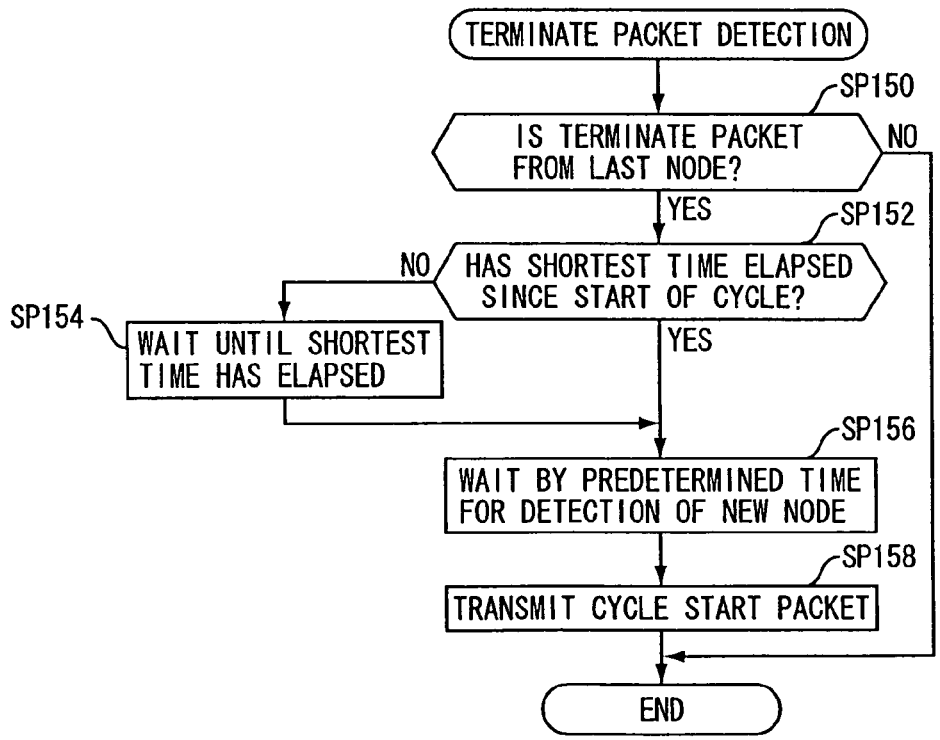

In such a case, the conductor node invokes a failed node detecting routine shown in FIG. 10(*a*). As shown, the processing proceeds to step SP130, and it is determined whether the failed node is the last node in the transmission sequence. When the answer is "NO" here, the processing proceeds to step SP132 in which a node immediately subsequent to the failed node is instructed to transmit a control data packet bundle. Next, the processing proceeds to step SP134 in which the transmission sequence is updated to eliminate the failed node. In other words, a transmission sequence list corresponding to a new transmission sequence is created to eliminate the failed node from the original transmission sequence. Therefore, each node outputs each control data packet bundle according to the new transmission sequence in the next control cycle 240.

4.8.2. Additional Detection of New Node

As mentioned above, any new node is hot-pluggable to the network 1000. Since a short idle time is provided at the end of each control cycle 240, the new node can inform the conductor node within the idle time that "its own node has been connected." Upon receipt of this information, the conductor node invokes a node connection detecting routine shown in FIG. 10(*b*). As shown, when the processing proceeds to step SP140, the transmission sequence is changed to add the new node. In other words, a transmission sequence list corresponding to a new transmission sequence is created to add the new node to the original transmission sequence. Therefore, each node outputs each control data packet bundle according to the new transmission sequence in the next control cycle 240. In addition to the node newly connected to the network, any other nodes that are not included in the transmission sequence indicated in the cycle start packet 250 may also be processed as new nodes.

4.8.3. Terminate Packet Detection Processing

The conductor node invokes a terminate packet detecting routine shown in FIG. 10(*c*) each time a terminate packet 266 is detected from any other node. As shown, when the processing proceeds to step SP150, it is determined whether the terminate packet 266 is outputted from the last node in the transmission sequence. When the answer is "NO" here, the routine processing is ended immediately. On the other hand, if the answer is "YES" here, the processing proceeds to step SP152. In step SP152, it is determined whether the shortest time period (250 msec) of the control cycle 240 has elapsed after start of the current control cycle 240.

If the answer is "NO" here, the processing proceeds to step SP154 to wait until the shortest time period has elapsed.

On the other hand, if the answer is "YES" here, the processing step SP154 is skipped. Next, the processing proceeds to step SP156 in which a short standby pause is put to the processing for the purpose of detecting a new node (so that the new node can inform the conductor node of its connection in the manner mentioned above). Then, the processing proceeds to step SP158 in which a cycle start packet 250 that reports the latest transmission sequence to each node is outputted, thereby starting a new control cycle 240. The transmission sequence list included in the cycle start packet 250 is the latest transmission sequence list in which the change results in step SP134 of FIG. 10(*a*) or the change results in step SP140 of FIG. 10(*b*) are reflected. Then, when receiving the cycle start packet 250, each node on the network 1000 holds the latest transmission sequence list included in the cycle start packet 250.

5. Modifications

The present invention is not limited to the embodiment mentioned above, and various modifications are possible as follows:

(1) In the above-mentioned embodiment, although various kinds of processing were performed by the program running on each node or the application program running on a personal computer, only the programs may be stored on a recording medium like a CD-ROM or flexible disk and distributed in the form of such a recording medium, or distributed through a transmission line.

(2) In the control data receiving routine (FIG. 7) executed by each node according to the above-mentioned embodiment, if any of the blocks 404-410 was included in the report packet 262, the block was written in step SP48 over a corresponding portion in the node region 400-k related to the transmit node, and then, the CRC code was checked in step SP56. However, the sequence of both steps may be reversed. In other words, CRC codes related to the blocks 404-410 in the report packet 262 received are checked, and the following processing may be such that if the CRC code of a block is matched, the block is written over a corresponding portion, or if not matched, request data is created to request the retransmission of the block without overwriting of the block.

(3) Further, in steps SP100 to SP106 of the control data receiving routine (FIG. 9) executed by each PC, only the change data corresponding to unconfirmed change instructions was checked as to whether the change data contradicts the contents of the change instructions. However, in addition to the change instructions operated on the PC, all the change data in the RW block of any node may be error-checked, and a warning may be generated each time an error is found. In this case, steps SP101 to SP104 may be changed as follows:

Step SP1001: In this step, it is determined whether the change data is "change data in the RO block 404." If the answer is "NO," the processing proceeds to step SP1002, or if the answer is "YES," it proceeds to step SP108.

Step SP1002: In this step, the change data are compared with corresponding values of the RW blocks 406-410 stored on the PC to determine whether both match with each other. If a mismatch is found, the warning processing at step SP106 is executed. If all match the corresponding values, the processing proceeds to step SP108.

Thus, even when the processing contents are changed, unconfirmed change instructions on the PC can be correctly checked.

(4) In the above-mentioned embodiment, the monitoring of the setting state or physical quantities of each amplifier I/O node, and the remote control of the setting state were described by way of example to illustrate the present invention, but the monitoring and remote control can be performed on any other nodes, such as the general-purpose I/O nodes.

According to the first aspect of the invention, there is provided a signal transmission apparatus connected to a network as one node among a plurality of nodes involved in the network which is provided with an audio signal transmission period for transmitting two or more channels of audio signals (packets 211, 212, . . . , 21n) every predetermined transmission cycle (200) and a control data transmission period for transmitting control data (packet 220) using an idle time period other than the audio signal transmission period. The inventive apparatus comprises a storage section (122) that stores configuration information (400) of all the nodes involved in the network, each configuration information (400) of each node being divided into a plurality of blocks (404-410), each block being assigned with an error-checking code (CRC code), an error-checking code receiving section (110) that recurrently receives error-checking codes of the configuration information of other nodes through the network, a comparison section that compares the received error-checking codes with corresponding error-checking codes stored in the storage section so as to detect a block of the configuration information (400) in which an error has occurred, a transmission section that transmits request data to a particular node corresponding to the configuration information containing the detected block, the request data requesting the particular node for transmission of a block corresponding to the detected block in which an error has occurred, a configuration information receiving section that receives the corresponding block of the configuration information from the particular node, an update section that updates the detected block according to the corresponding block of the received configuration information, and an error-checking code updating section that creates a new error-checking code for the updated block of the configuration information and writes the created error-checking code into a corresponding portion of the stored configuration information.

The inventive signal transmission apparatus may further comprises an error-checking code transmitting section (110) that recurrently transmits an error-checking code (CRC code) corresponding to a block of the configuration information which indicates its own setting state of the one node, and a configuration information transmitting section (110) that transmits the block of the configuration information corresponding to the error-checking code to another node when the one node receives request data from said another node for requesting the transmission of the block of the configuration information corresponding to the error-checking code.

As described above, according to the first aspect of the present invention, the signal transmission apparatus requests other nodes to transmit only the necessary block(s) according to the comparison results of error checking codes, so that the latest configuration information on all the nodes can be received in such an efficient manner as to minimize the total amount of data traffic flowing through the network, thereby stabilizing the data communications on the network. Further, even if the configuration information cannot be received from other nodes due to a communication error, the configuration information can be made up later in such an efficient manner as to minimize the total amount of data traffic through the network.

According to the second aspect of the invention, there is provided a signal transmission apparatus connected, as a conductor node for controlling two or more nodes, to a network to which the plurality of nodes are connected and in which an audio signal transmission period for transmitting two or more channels of audio signals (packets 211, 212, . . . , 21n) every predetermined transmission cycle (200) and a control data transmission period for transmitting control data (packet 220) using an idle time period other than the audio signal transmission period are provided. In the inventive apparatus, the list creation subsection (SP134, SP140) creates a transmission order list (cycle start packet 250) representing the order of transmission of the plurality of nodes. The transmission section (SP158) transmits the transmission order list through the network. The monitoring subsection monitors whether the plurality of nodes transmit the control data according to the transmission order list. The instruction section (SP132) detects a failed node that does not transmit the control data despite reaching its turn transmitting the control data and instructs a node immediately subsequent to the failed node in the transmission sequence to transmit the control data. When the failed node is detected, the list creation section creates a new transmission order list from which the failed node is eliminated. Further comprises, the new node detection section detects whether a new node is added to the network. When the new node is detected, the list creation section creates a new transmission order list to which the new node is added.

As described above, according to the second aspect of the present invention, a transmission order list is transmitted to all nodes promptly in response to detection of a failed node or addition of a new node to the network, so that all the nodes can transmit the latest configuration information without data collision on the network in such an efficient manner as to minimize the total amount of data flowing through the network, thereby stabilizing the data communications on the network.

According to the third aspect of the invention, there is provided a signal transmission apparatus connected as one of multiple nodes to a network in which an audio signal transmission period for transmitting two or more channels of audio signals (packets 211, 212, . . . , 21n) every predetermined transmission cycle (200) and a control data transmission period for transmitting control data (packet 220) using an idle time period other than the audio signal transmission period are provided. IN the inventive apparatus, the storage section (122) stores configuration information (400) on all the multiple nodes. The reception section receives change instructions of configuration information on any of the multiple nodes from a control device (PC) connected to the signal transmission apparatus. The determination section determines whether the change instructions are to instruct on changing configuration information related to the signal transmission apparatus. The instruction data transmitting section transmits instruction data to other nodes to make changes according to the change instructions without changing the configuration information (400) on the condition that the change instructions are to instruct on changing configuration information related to the other nodes. The configuration information updating section receives from the other nodes change data indicating that the configuration information has been changed at the other nodes, and changing, based on the change data, a corresponding portion(s) of the configuration information held in the storage section. Further, the update section updates a corresponding portion(s) in the storage section (122) on the condition that the change instructions are to instruct on changing configuration information related to the signal transmission apparatus. The change data transmitting section transmits to the other nodes change data representing the contents updated by the update section.

As described above, according to the third aspect of the present invention, a change(s) in the configuration information instructed from the control device can be reflected on all the nodes on the network, regardless of to which node on the network the control device is connected, without any contradiction using a small amount of data. Even though control devices are connected to two or more nodes on the network, respectively, each control device can change the configuration information independently, so that changes in the configuration information instructed from respective control devices can be reflected on all the nodes on the network without any contradiction.

According to the fourth aspect of the invention, there is provided a node control method performed by a control device connected to one of multiple nodes connected to a network in which an audio signal transmission period for transmitting two or more channels of audio signals (packets 211, 212, . . . , 21*n*) every predetermined transmission cycle (200) and a control data transmission period for transmitting control data (packet 220) using an idle time period other than the audio signal transmission period are provided. The inventive method is carried out by a configuration information receiving step of receiving configuration information (400) on all the multiple nodes from the one node, a step of displaying the contents of the configuration information (400) on a display unit (136), a change operation detecting step of detecting change operations (operations in display window 300) for instructing on changing part of the configuration information (400), a step (SP84) of notifying the one node of the change instructions corresponding to the change operations, a step of changing or rewriting part of the configuration information according to the change operations, a step of changing the display contents of the display unit (136) based on the changed configuration information, a change data receiving step of receiving change data from the one node to inform that a portion corresponding to the change instructions has been changed, a matching determination step (SP104) of determining whether the received change data matches the contents of the part of the configuration information, a warning step (SP106) of giving a warning of the occurrence of a mismatch on the condition that the mismatch has been determined in the matching determination step (SP104), a step (SP108) of updating the contents of the part of the configuration information to make them match the change data on the condition that the mismatch has been determined in the matching determination step (SP104), and a step (SP108) of changing the display contents on the display unit (136) to the contents corresponding to the change data on the condition that the mismatch has been determined in the matching determination step (SP104). The node control method further comprises an operation mode setting step of setting an operation mode for determining whether to give a warning, wherein the warning step is a step of giving a warning on the condition that the operation mode is set to give a warning and the mismatch has been determined in the matching determination step (SP104). The node control method further comprises an indication mode changing step of setting, after the change operation detecting step, an indication mode of a specific portion of the display contents on the display unit (136), the specific portion instructed to change and related to the configuration information, in such a manner that the indication mode will be different from a normal indication mode, and an indication mode restoring step of changing the indication mode of the specific portion back to the normal indication mode after the change data receiving step.

As described above, according to the fourth aspect of the present invention, since the contents changed according to the operations on the control device can be reflected in both the contents of the configuration information held in the control device and the display contents immediately after changing, the contents of the change instructions can be checked promptly on the control device. Further, when the change data related to a portion instructed to change is different from the contents of the configuration information, the configuration information is updated according to the change data. This makes it possible not only to promptly check whether all the nodes on the network are set as instructed, but also to ensure that the same configuration information is held on the control device and all the nodes on the network. According to the structure in which it can be selected whether to give a warning according to the operation mode, a warning indication can be, for example, turned off on the control unit used only as a monitor to eliminate the inconvenience of viewing an error warning over and over again and closing the error warning whenever the error warning is indicated. Further, according to the structure in which the indication mode is changed before and after the change operation detecting step and the change data receiving step, it is possible to check at first sight whether the contents of change instructions are reflected on actually corresponding nodes and check the duration of controlling the nodes on the network (a delay in control) from the duration of indication in the different mode.

According to the fifth aspect of the invention, there is provided a signal transmission system composed of a network (1000) and two or more nodes connected to the network in which an audio signal transmission period for transmitting two or more channels of audio signals (packets 211, 212, . . . , 21*n*) every predetermined transmission cycle (200) and a control data transmission period for transmitting control data (packet 220) using an idle time period other than the audio signal transmission period are provided. Each of the plurality of nodes comprises the report signal generating section (SP12, SP14) for generating a report signal (262) representing the state of the node every variable-length control cycle (240), a timing detection section (118) for detecting the timing allocated to the node in each control cycle, and a transmission section (SP4, SP8, SP16, SP22) for transmitting control data (251-254) including the generated report signal (262) at the timing detected. A conductor node predetermined from among the plurality of nodes comprises the first determination section (SP152) for determining whether a predetermined time period has elapsed since the start of the previous control cycle, the second determination section (SP150) for determining whether the transmission of the control data from all the nodes is completed in the current control cycle, and the cycle starting section for transmitting a start signal (cycle start packet 250) for a new control cycle (240) to all other nodes to start the new control cycle when the results of the determination by the first and second determination sections are affirmative.

In the signal transmission system, the plurality of nodes include at least first and second nodes. The first node comprises an interface (116) connected to a display unit (display unit 136 for PC) for indicating some physical quantities, and specification section (SP74) for creating instruction data specifying the physical quantities to be indicated on the display unit (PC) and measured at the second node. The transmission section on the first node outputs control data including the instruction data through the network at the timing allocated to the first node. The second node comprises physical quantity data creating section (SP20, SP22) for creating physical quantity data (264) on physical quantities, to be measured in the second node, based on the instruction data (physical quantities instructed from the conductor node through the cycle start packet 250) included in the control data transmitted from the first node, and the transmission section on the second node transmits control data including the physical quantity data (264) at the timing allocated to the second node.

In the signal transmission system, the physical quantities consist of ever-changing first physical quantities (voltage, power, impedance) and infrequently-changing second physical quantities (temperature), and the transmission section on the second node outputs not only physical quantity data (264) related to the first physical quantities every control cycle (240), but also physical quantity data (event data packet 260) related to the second physical quantities (temperature) on the condition that a change in any of the second physical quantities has been detected.

As described above, according to the fifth aspect of the invention, in the system for transmitting control data from all nodes through control data transmission periods every variable-length control cycle, fast transmission of control data can be achieved in the case of a small amount of audio signal data. Even in the case of a large amount of audio signal data, the duration of the control cycle can be made longer to ensure the transmission of control data.

Further, according to the structure in which the second node transmits physical quantities instructed from the first node, the amount of physical quantity data transmitted on the network can be minimized. This makes it possible to make the occupied band on the network narrower.

Furthermore, according to the structure in which the physical quantity data related to the infrequently-changing second physical quantities is outputted on the condition that a change in any of the second physical quantities has been detected, the amount of physical quantity data can be further reduced.

What is claimed is:

1. A signal transmission apparatus connected to a network as one node among a plurality of nodes involved in the network which is provided with an audio signal transmission period for transmitting a plurality of channels of audio signals each transmission cycle and a control data transmission period for transmitting packets of control data of the plurality of the nodes each control cycle by using an idle time period other than the audio signal transmission period, said signal transmission apparatus comprising:

a storage section that stores configuration information of said one node, the configuration information representing a setting state of said one node and being divided into a plurality of information blocks;

a receiving section that receives a transmission order list from a node predetermined among the plurality of the nodes, the transmission order list indicating a predetermined transmission order;

a transmitting section that transmits a packet of the control data according to the received transmission order list within the control data transmission period at a timing when a turn of said one node comes in the predetermined transmission order, the packet including at least an error checking code of the configuration information, the error checking code being a code data for checking an error of the configuration information; and a control section that determines whether the configuration information contains an information block to be transmitted at the timing, and operates in case that the configuration information is determined to contain the information block to be transmitted for controlling the transmitting section to transmit the packet containing only the information block and the error checking code, and otherwise operates in case that the configuration information is determined to contain no information block to be transmitted for controlling the transmitting section to transmit the packet containing only the error checking code.

2. The signal transmission apparatus according to claim 1, wherein the receiving section receives an error checking code from another node through the network, the error checking code being a code data for checking an error of configuration information representing a setting state of said another node, wherein the storage section further stores configuration information of all the nodes including said another node together with error checking codes corresponding to the respective configuration information, and wherein the control section includes a comparison subsection that compares the received error checking code of said another node with the stored error checking code corresponding to said another node so as to detect an inconsistency between the received error checking code and the stored error checking code, such that the control section operates when the inconsistency is detected for controlling the transmitting section to transmit the control data containing request data to said another node, the request data requesting said another node for transmission of an information block of the configuration information associated to the received error checking code.

3. The signal transmission apparatus according to claim 2, wherein the receiving section receives request data from another node, the request data requesting said one node for transmission of an information block of the configuration information of said one node, such that the control section operates upon the receiving of the request data for controlling the transmitting section to transmit the packet containing the information block to said another node.

4. The signal transmission apparatus according to claim 1, wherein the plurality of the nodes involved in the network sequentially transmit the control data according to the predetermined transmission order indicated by the transmission order list within the control data transmission period, such that the control section controls the transmitting section to transmit the control data at a timing when a turn said one node comes in the predetermined transmission order.

5. A signal transmission method performed in one node among a plurality of nodes connected to a network which is provided with an audio signal transmission period for transmitting a plurality of channels of audio signals each transmission cycle and a control data transmission period for transmitting packets of control data of the plurality of the nodes each control cycle by using an idle time period other than the audio signal transmission period, said signal transmission method comprising the steps of:

receiving a transmission order list from a node predetermined among the plurality of the nodes, the transmission order list indicating a predetermined transmission order;

storing configuration information of said one node, the configuration information representing a setting state of said one node and being divided into a plurality of information blocks;

transmitting a packet of the control data according to the received transmission order list within the control data transmission period at a timing when a turn of said one node comes in the predetermined transmission order, the packet including at least an error checking code of the configuration information, the error checking code being a code data for checking an error of the configuration information;

determining whether the configuration information contains an information block to be transmitted at the timing; and transmitting the packet containing only the information block and the error checking code in case that the configuration information is determined to contain the information block to be transmitted, and otherwise transmitting the packet containing only the error checking code in case that the configuration information is determined to contain no information block to be transmitted.

* * * * *